US006806927B2

(12) United States Patent
Nimura

(10) Patent No.: US 6,806,927 B2
(45) Date of Patent: Oct. 19, 2004

(54) STEP-ELIMINATING FILM AND ISLAND-SHAPED PATTERN COMPOSED OF CONDUCTIVE FILM FOR A REFLECTIVE ELECTROOPTIC DEVICE AND ELECTRONIC APPARATUS

(75) Inventor: Toru Nimura, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/341,517

(22) Filed: Jan. 14, 2003

(65) Prior Publication Data

US 2003/0174267 A1 Sep. 18, 2003

(30) Foreign Application Priority Data

Jan. 23, 2002 (JP) ........................................ 2002-014606
Dec. 18, 2002 (JP) ........................................ 2002-366709

(51) Int. Cl.[7] ........................................... G02F 1/1335
(52) U.S. Cl. ..................................... 349/113; 349/114
(58) Field of Search .................................. 349/113, 114

(56) References Cited

U.S. PATENT DOCUMENTS 6,172,728 B1 * 1/2001 Hiraishi ...................... 349/139
6,259,500 B1 * 7/2001 Kijima et al. ................ 349/113
6,262,783 B1 * 7/2001 Tsuda et al. .................. 349/39
6,556,260 B1 * 4/2003 Itou et al. ..................... 349/69

FOREIGN PATENT DOCUMENTS

JP   A-10-221704   8/1998

* cited by examiner

Primary Examiner—Robert H. Kim
Assistant Examiner—Andrew Schechter
(74) Attorney, Agent, or Firm—Oliff & Berridge, PLC

(57) ABSTRACT

The invention provides a reflective electrooptic device and an electronic apparatus using the reflective electrooptic device described above. In the reflective electrooptic device, variation in irregular shape is avoided or reduced by maintaining uniform conditions at the lower layer side of an irregularity-forming layer when being formed by a photolithographic technique. In a TFT array substrate of a reflective electrooptic device, an irregularity-forming layer to form an irregular pattern on a light reflection film is formed by half exposure, development, and heating performed for a photosensitive resin. At a lower layer side of the irregularity-forming layer, since a height difference, i.e., a step is eliminated by a step-eliminating film, exposure can be preferably performed for the photosensitive resin. In addition, since the height difference is eliminated, variation in thickness of the photosensitive resin is small, and hence variation in irregular shape becomes small.

27 Claims, 22 Drawing Sheets

(K)

(L)

(A)

(B)

LIGHT FROM BACKLIGHT

STEP-ELIMINATING FILM AND ISLAND-SHAPED PATTERN COMPOSED OF CONDUCTIVE FILM FOR A REFLECTIVE ELECTROOPTIC DEVICE AND ELECTRONIC APPARATUS

BACKGROUND OF THE INVENTION

1. Field of Invention

The present invention relates to reflective electrooptic devices and electronic apparatuses using the same. More particularly, the present invention relates to a pixel structure of a reflective electrooptic device.

2. Description of Related Art

Related art electrooptic devices, such as liquid crystal devices, can be used as direct viewing type display devices for various apparatuses. Among the electrooptic devices described above, for example, in an active matrix liquid crystal device using TFTs as a non-linear element to provide pixel switching, as shown in FIGS. 25 and 26, pixel switching TFTs (thin film transistors) 30 and pixel electrodes 9*a*, each electrode being composed of a transparent conductive film, such as an ITO film, and being connected to the corresponding TFT 30, are formed on a TFT array substrate 10, and in addition, liquid crystal 50 used as an electrooptic material is held between the TFT array substrate 10 and a counter substrate 20.

In addition, in a reflective liquid crystal device, a light reflection film 8*a* to reflect outside light incident from the counter substrate 20 side is formed at a lower layer side of a pixel electrode 9*a* so that the incident light is reflected from the TFT array substrate 10 side to the counter substrate 20 side, thereby displaying an image using light emitted from the counter substrate 20 side (reflection mode).

However, in a reflective liquid crystal device, when the directionality of light reflected from the light reflection film 8*a* is strong, apparent viewing angle dependence occurs in which brightness of image varies depending on a viewing angle or the like. Accordingly, when liquid crystal devices are manufactured, a photosensitive resin, such as an acrylic resin, is applied to an interlayer insulating film 4 or a surface protection film 14 formed thereon, and on the surface thereof, an irregularity-forming layer 13*a* is formed by a photolithographic technique, thereby forming an irregular pattern 8*g* for light scattering on a surface of the light reflection film 8*a*.

In the following example, as shown in FIG. 27, after half exposure is performed for a photosensitive resin 13 using an exposure mask 200 so that the photosensitive resin 13 is partly exposed in the thickness direction thereof, the photosensitive resin 13 is melted by heating following the development, thereby forming the irregularity-forming layer 13*a* having irregularities thereon in conformity with gentle changes in film thickness. Accordingly, the light reflection film 8*a* is formed directly on the upper layer of the irregularity-forming layer 13*a*.

That is, when half exposure is performed for the photosensitive resin 13, since the photosensitive resin 13 are only partly exposed in the thickness direction thereof, after being developed, concave portions 13*b* are formed at positions which were exposed, and at the same time, the original thickness is maintained at positions which were not exposed. Accordingly, when the photosensitive resin 13 is melted by performing heat treatment following the development, the thickness of the photosensitive resin 13 changes gently, thereby forming the irregularity-forming layer 13*a* having gentle irregularities thereon in conformity with the changes in film thickness described above. As a result, even when the light reflection film 8*a* is formed directly on the upper layer of the irregularity-forming layer 13*a*, the gentle irregular pattern 8*g* having no edges is formed on the surface of the light reflection film 8*a*.

However, in a related art liquid crystal device, since conductive films forming various wires and the TFT 30, such as a scanning line 3*a*, a capacitance line 3*b*, a data line 6*a*, and a drain electrode 6*b*, are formed at the lower layer side of the irregularity-forming layer 13*a*, a height difference is formed in accordance with the presence of the conductive films described above. That is, in a pixel region, the following are provided: a first region 10*a* in which an extending portion 1*f* of a semiconductor film 1*a*, the capacitance line 3*b*, and the drain electrode 6*b* are provided so as to form a multilayer structure; a second region 10*b* in which the drain electrode 6*b* is formed, but the extending portion 1*f* of the semiconductor film 1*a* and the capacitance line 3*b* are not formed; and a third region 10*c* in which the extending portion 1*f* of the semiconductor film 1*a*, the capacitance line 3*b*, and the drain electrode 6*b* are not formed. As a result, among the regions described above, the height differences are present in accordance with the difference in the number of conductive films formed in the region. Hence, as shown in FIG. 27, when exposure is performed for the photosensitive resin 13, since the distance from a light source to a higher position of the step thus formed is different from that to a lower position thereof, focus blurring occurs, resulting in occurrence of uneven exposure.

In addition, when exposure is performed for the photosensitive resin 13, between a region (the first region 10*a*, and the second region 10*b*) in which the conductive films are provided at the lower layer side and a region (the third region 10*c*) in which the conductive film is not provided at the lower layer side, a problem of uneven exposure, which is caused by the presence and non-presence of reflected light from the conductive film and the variation in intensity thereof, occurs.

When the uneven exposure described above occurs, for example, since the concave portion 13*b* of the irregularity-forming layer 13 may become shallower at a lower position, the irregularity-forming layer 13*a* cannot be formed as designed. Accordingly, it is not preferable since a desired irregular pattern cannot be formed on the surface of the light reflection film 8*a*.

In addition, there is the case in which the irregularity-forming layer 13*a* is entirely exposed so as to form a predetermined pattern, and the irregular pattern 8*g* is formed on the surface of the light reflection film 8*a* in accordance with the presence and non-presence of the irregularity-forming layer 13*a*. In the case described above, since edges are formed on the irregularity-forming layer 13*a*, after a photosensitive resin having high fluidity is applied onto the upper layer of the irregularity-forming layer 13*a* to additionally form an upper insulating film, on the upper layer side thereof, the light reflection film 8*a* is formed. However, even in this case, when there is a height difference at the lower layer side of the irregularity-forming layer 13*a*, uneven exposure occurs.

In addition, when a photosensitive resin is applied onto a region in which a height difference is present, due to the planation as shown in FIG. 27, a thin film of the photosensitive resin is formed in a higher region, and on the other side, a thick film thereof is formed in a lower region. As a result, after exposure and development, when the photosensitive resin 13 is melted by heating to form a irregularity-forming layer 13a having gentle irregularities thereon, since the thin film of the photosensitive resin is formed in the higher region, the sag of the resin is small, thereby forming relatively large irregularities. On the other hand, since the thick film of the photosensitive resin is formed in the lower region, the sag of the resin becomes large, and hence the irregularities become small, resulting in a disadvantageous increase in variation of the irregularities.

SUMMARY OF THE INVENTION

The present invention addresses or solves the above and/or other problems, and provides a reflective electrooptic device and an electronic apparatus using the same. In the reflective electrooptic device described above, when the irregularity-forming layer is formed by a photolithographic technique, the conditions at the lower layer side of the irregularity-forming layer are maintained uniform so that no variation of irregular shape occurs. In addition, the present invention provides a reflective electrooptic device and an electronic apparatus using the same. In the reflective electrooptic device described above, the uniformity of a cell gap at a reflection portion is enhanced by eliminating or substantially eliminating a step formed in a reflection region so as to enhance display quality such as contrast.

Thus, a reflective electrooptic device of the present invention includes: at least one substrate; an electrooptic material held by the substrate; an insulating film; a pixel switching active element which is composed of at least one conductive film, which is provided in each pixel on the substrate, and which is electrically connected to at least one wire composed of a conductive film; a light reflection film provided in each pixel on the substrate; an irregularity-forming layer provided in a region under the light reflection film for forming a predetermined irregular pattern on a surface of the light reflection film; and at least one step-eliminating film formed in each pixel to eliminate a height difference formed by the presence of the conductive film forming the active element, the step-eliminating film being provided in a region under the irregularity-forming layer. The step-eliminating film is composed of at least one of the conductive film forming the wire, the conductive film forming the active element, and the insulating film.

In a reflective electrooptic device, when the numbers of conductive films forming various wires and an active element are different from each other, a height difference, i.e., a step corresponding to the film thickness is formed. However, in the present invention, since the step-eliminating film is formed in a region in which the number of conductive films is small, the height difference, i.e., the step is eliminated at the lower layer side of the irregularity-forming layer by this step-eliminating film. Accordingly, when the irregularity-formning layer is formed by exposing a photosensitive resin, since an apparent height difference is not present between a higher position and a lower position, uneven exposure does not or substantially does not occur. In addition, when a photosensitive resin is applied to a region in which a height difference is present, a thin film of the photosensitive resin is formed on a higher position, and on the other hand, a thick film of the photosensitive resin is formed on a lower position. Accordingly, after exposure and development are performed, when the photosensitive resin is melted by heating to form an irregularity-forming layer having gentle irregularities thereon, the sag of the resin is small at the higher position since the film of the photosensitive resin is thin, and as a result, relatively large irregularities tend to be formed. However, according to the present invention, the problem described above can also be solved. Hence, since the irregularity-forming layer can be formed as designed, a desired irregular pattern can be formed on the surface of the light reflection film. In addition, since the step-eliminating film is formed of the conductive film forming the wire, the conductive film forming the active element, or the insulating film, an additional manufacturing step is not required when the step-eliminating film is formed. Furthermore, when a height difference is present at the lower side of the pixel electrode, the thickness of an electrooptic material layer composed of liquid crystal or the like varies from region to region. However, according to the present invention, the height difference is eliminated, advantage in that display quality is improved can also be obtained.

In the present invention, the step-eliminating film is preferably composed of at least one of the conductive film forming the wire, the conductive film forming the active element, and the insulating film. When there is a region in which a conductive film is partly provided, due to the presence and non-presence of light reflected from the conductive film and variation in intensity thereof, uneven exposure tends to occur when exposure is performed. However, according to the structure described above of the present invention, since the conductive films are provided over almost the entire area of each pixel, uneven exposure does not occur. In addition, thermal conductivity is different between in a region provided with a conductive film and in a region provided with no conductive film, and hence variation in temperature tends to occur, however, when the conductive films are formed over almost the entire area, the variation in temperature can be reduced, and hence uniform curing rate of the photosensitive resin can be obtained. Accordingly, since the irregularity-forming layer can be formed as designed, a desired irregular pattern can be formed on the surface of the light reflection film. In addition, since the step-eliminating film is formed of the same layer as that for the conductive film forming the wire or the active element, an additional manufacturing step is not required when the step-eliminating film is formed.

In the present invention, for example, the step-eliminating film is formed selectively in a region in which the number of conductive films forming the active element is small, thereby eliminating the height difference.

In the present invention, when the active element comprises a thin-film transistor connected to a scanning line and a data line, which are each used as the wire, the step-eliminating film described above may include at least one of a conductive film which is composed of the same layer as that for the scanning line and is formed simultaneously therewith, and a conduct film which is composed of the same layer as that for the data line and is formed simultaneously therewith.

In addition, in the present invention, when the active element includes a thin-film transistor connected to a scanning line and a data line, which are each used as the wire, and a capacitance line is provided in each pixel to form storage capacitance, the step-eliminating film may include at least one of a conductive film composed of the same layer as that for the scanning line, a conductive film composed of the same layer as that for the capacitance line, and a conduct film composed of the same layer as that for the data line.

In the present invention, the step-eliminating film preferably has an island shape formed separately from the conductive film forming the wire or the conductive film forming the active element. According to this structure, parasite capacitance can be prevented or substantially prevented from being generated in a region in which the step-eliminating film overlaps another layer in plan view.

In the present invention, the step-eliminating film may be formed of a conductive film extending from that to form the wire or that to form the active element. For example, a film extending from an upper electrode of a capacitance portion may be used as the step-eliminating film.

Furthermore, in with another aspect of the present invention, a reflective electrooptic device includes: at least one substrate; an electrooptic material held by the substrate; a pixel switching active element which is composed of at least one conductive film, which is provided in each pixel on the substrate, and which is electrically connected to at least one wire composed of a conductive film; a light reflection film provided in each pixel on the substrate; an irregularity-forming layer provided in a region under the light reflection film to form a predetermined irregular pattern on a surface of the light reflection film; and at least one island-shaped pattern which is provided in a region under the irregularity-forming layer and which is electrically isolated from the other regions. The island-shaped pattern is composed of at least one of the conductive film forming the wire and the conductive film forming the active element.

In the present invention, the irregularity-forming layer may be composed of a photosensitive resin provided with irregularities thereon in conformity with gentle changes in film thickness, and in the case described above, the surface of the light reflection film is provided with the irregular pattern transferred from the irregularities formed on the surface of the irregularity-forming layer. The structure described above can be realized when the photosensitive resin is half-exposed using an exposure mask and is then developed to form the irregularity-forming layer.

In the present invention, the irregularity-forming layer may be composed of a photosensitive resin formed selectively into a predetermined pattern in some cases, and in the case described above, the surface of the light reflection film is provided with the irregular pattern in accordance with the presence and non-presence of the irregularity-forming layer. The structure described above can be realized when the photosensitive resin is exposed using an exposure mask and is then developed to form the irregularity-forming layer.

In the case described above, when edges are present on the irregularity-forming layer, an upper insulating film may be formed on the irregularity-forming layer. According to this structure, the surface of the light reflection film may be provided with the irregular pattern which is transferred from irregularities of the irregularity-forming layer via the upper insulating film.

In the present invention, when the electrooptic device is formed as a reflective type, the irregularity-forming layer is formed over almost the entire area of each pixel.

On the other hand, when the electrooptic device of the present invention is formed as a transflective type, the structure may be formed in which a light-transmitting window is formed in the light reflection film. In the case described above, in order to prevent or substantially prevent a decrease in light transmittance, it is preferable that the step-eliminating film or the island-shaped pattern be not formed in a region of the light-transmitting window. In the case in which the structure is formed as described above, even when uneven exposure occurs in the region of the light-transmitting window, since it is not necessary to form an irregular shape composed of a photosensitive resin in this region, problems may not occur.

In the present invention, for example, the electrooptic material may include liquid crystal.

The electrooptic device of the present invention can be applied to a display device of an electronic apparatus, such as a mobile computer or a mobile phone, for example.

DETAILED DESCRIPTION OF PREFERRED EMBODIMENTS

Exemplary embodiments of the present invention are described below referring to figures.

Figure 1:
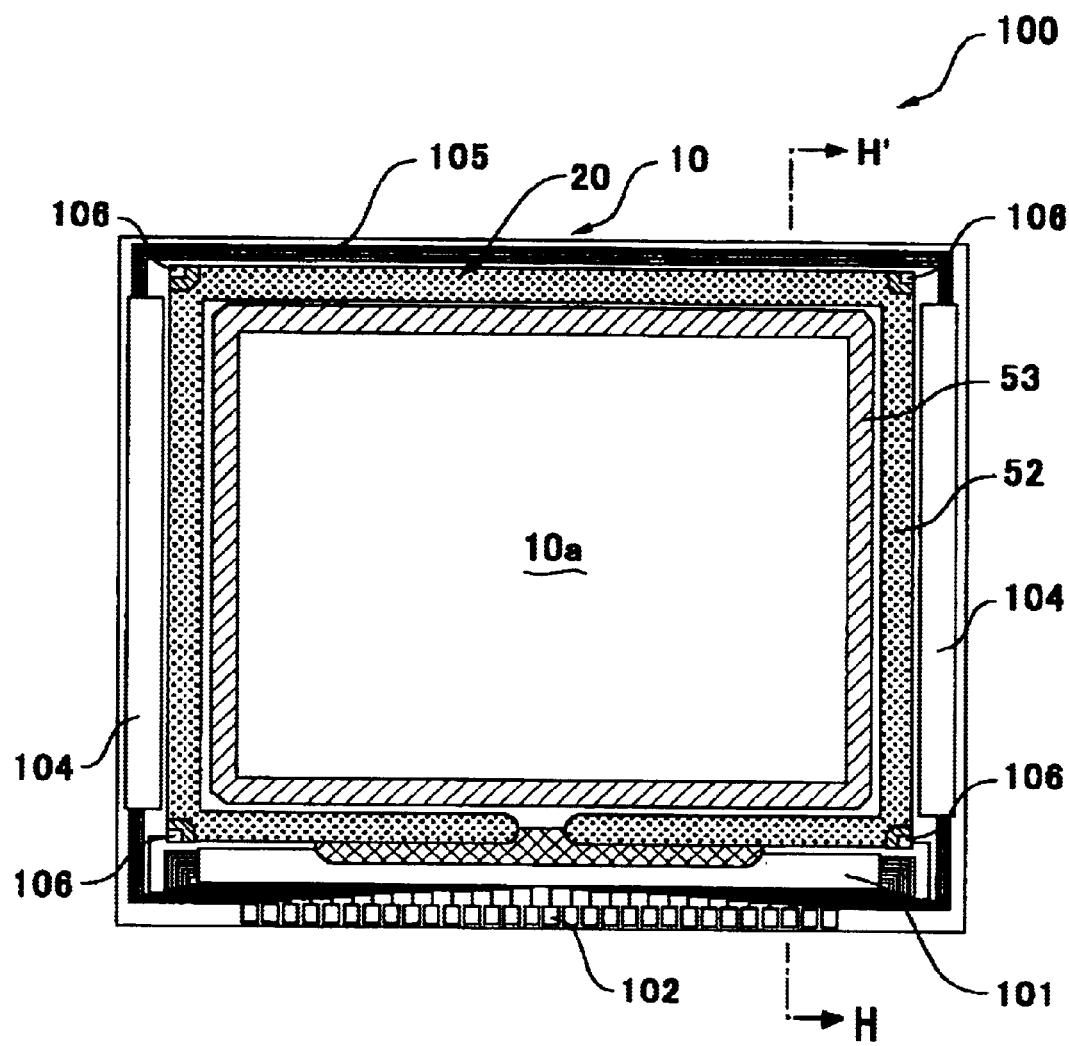
FIG. 1 is a plan view of an electrooptic device of the present invention when viewed from a counter substrate side.
Figure 2:
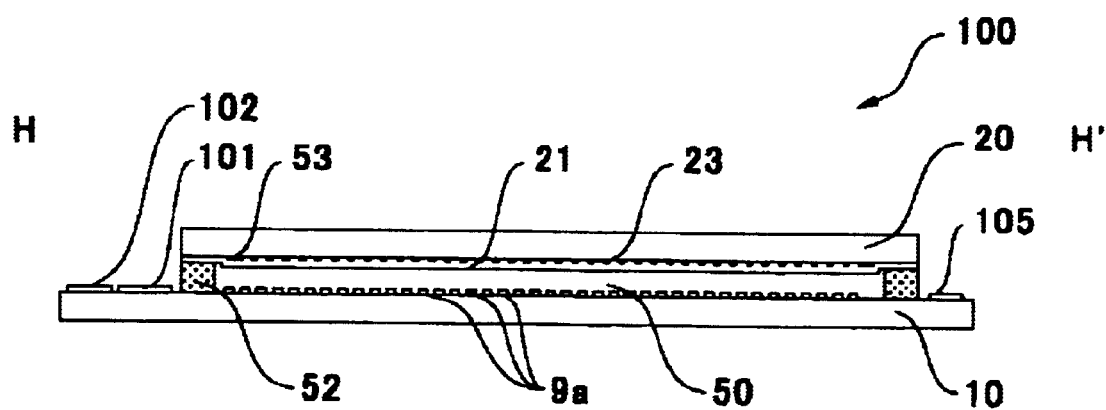
FIG. 2 is cross-sectional view taken along plane H-H' in FIG. 1.
Figure 3:
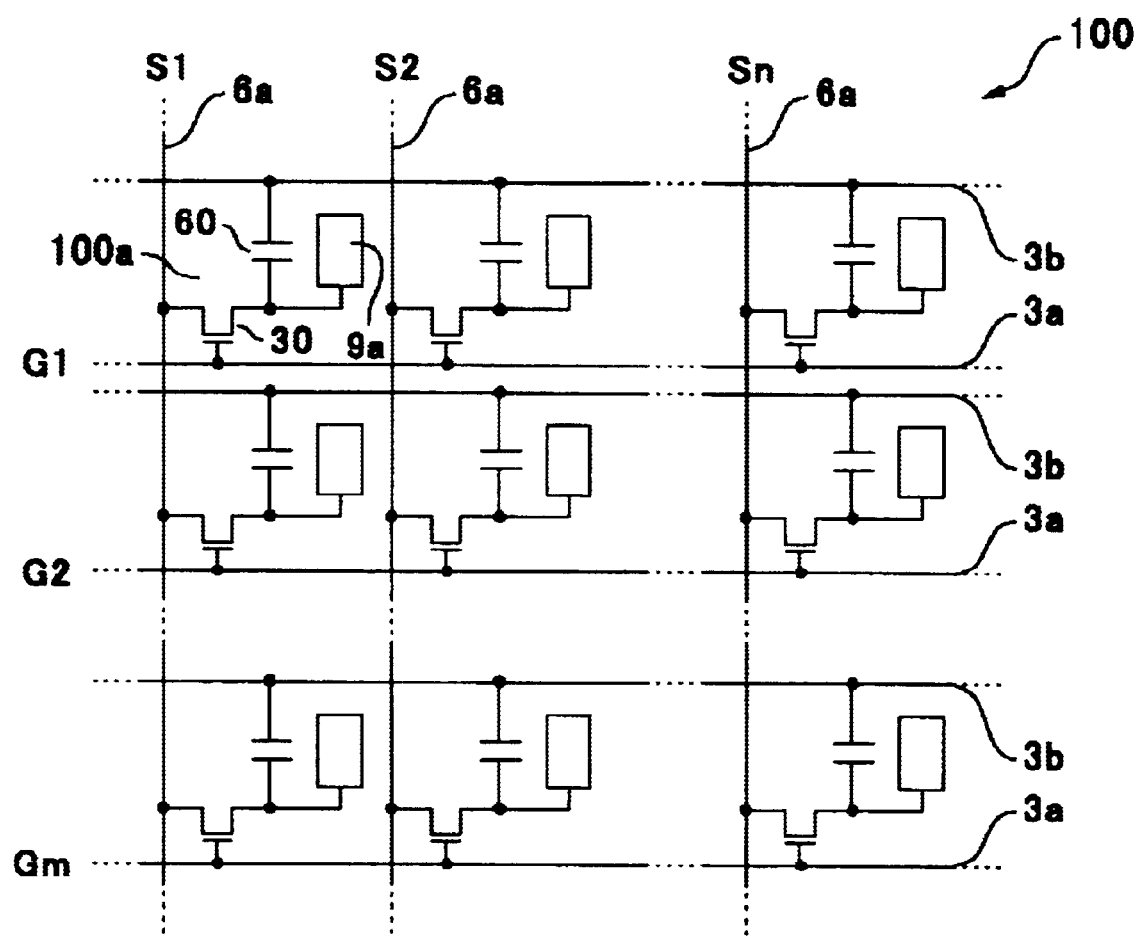
FIG. 3 is a schematic circuit diagram of various elements, wires, and the like formed in a plurality of pixels arranged in a matrix of an electrooptic device.

FIG. 1 is a plan view showing an electrooptic device of the present invention together with various constituent elements when viewed from a counter substrate side, and FIG. 2 is a cross-sectional view taken along plane H-H' shown in FIG. 1. FIG. 3 is a schematic circuit diagram showing various elements, wires, and the like in a plurality of pixels in a matrix provided in an image display region of an electrooptic device. In this exemplary embodiment, reduction scales of layers and members in the figures illustrating this exemplary embodiment are different from each other so that each constituent element can be recognized in the figures.

In FIGS. 1 and 2, in a reflective electrooptic device 100 of this exemplary embodiment, liquid crystal 50 used as an electrooptic material is held between a TFT array substrate 10 and a counter substrate 20 bonded thereto with a sealing material 52, and inside the area at which the sealing material 52 is provided, a peripheral delimiter 53 made of a shading material is formed. In areas outside the sealing material 52, a data line drive circuit 101 and mounting terminals 102 are formed along one side of the TFT array substrate 10, and along each of two sides adjacent to the one side mentioned above, a scanning line drive circuit 104 is formed. Along the remaining side of the TFT array substrate 10, a plurality of wires 105 to connect between the scanning line drive circuits 104 provided at both sides of the image display region, and in addition, a precharge circuit or an inspection circuit may be provided under the peripheral delimiter 53 or the like in some cases. In addition, a vertical conductive member 106 for electrical connection between the TFT array substrate 10 and the counter substrate 20 is formed at at least one position of each corner of the counter substrate 20.

Instead of forming the data line drive circuit 101 and the scanning line drive circuits 104 on the TFT array substrate 10, for example, a TAB (tape automated bonding) substrate on which a driver LSI is mounted may be electrically and mechanically connected to a terminal group formed at a peripheral portion of the TFT array substrate 10 with an anisotropic conductive film provided therebetween. In addition, in the electrooptic device 100, in accordance with the type of liquid crystal 50, that is, operation mode, such as a TN (twisted nematic) mode or an STN (super TN) mode, and in accordance with a normally white mode or a normally black mode, a polarizing film, a retardation film, a polarizing plate, and the like are each disposed in a predetermined direction. However, the elements mentioned above are omitted in the figures. When the electrooptic device 100 is formed for color display, in a region of the counter substrate 20, which opposes each pixel electrode (described below) of the TFT array substrate 10, RGB color filters are formed together with a protection film.

In an image display region 10a of the electrooptic device 100 having the structure as described above, a plurality of pixels 100a is formed in a matrix as shown in FIG. 3. In addition, in each pixel 100a, a pixel electrode 9a and a pixel switching TFT 30 to drive this pixel electrode 9a are formed, and a data line 6a to supply pixel signals S1, S2 . . . Sn is electrically connected to a source of the TFT 30. The pixel signals S1, S2 . . . Sn written to the data line 6a may be supplied in line sequence in that order or may be supplied to each group composed of a plurality of adjoining data lines 6a. In addition, a gate of the TFT 30 is electrically connected to a scanning line 3a, and the structure is formed in which scanning signals G1, G2 . . . Gm are applied pulsewise in that order to the scanning line 3a in line sequence at predetermined time intervals. The pixel electrode 9a is electrically connected to a drain of the TFT 30, and when the TFT 30, which is a switching element, is put in an ON state for a predetermined period of time, the pixel signals S1, S2 . . . Sn supplied from the data line 6a are written to each pixel at predetermined time intervals. The pixel signals S1, S2 . . . Sn at predetermined levels written to liquid crystal through the pixel electrode 9a as described above are retained in cooperation with a counter electrode 21 of the counter substrate 20, which is shown in FIG. 2, for a predetermined period of time.

In accordance with the change in alignment and ordering of the molecular aggregate of the liquid crystal 50 depending on the level of a voltage applied thereto, light is modulated, and hence gray scale display can be performed. In a normally white mode, in accordance with a voltage applied to the liquid crystal 50, the amount of incident light passing therethrough is decreased, and in a normally black mode, in accordance with a voltage applied to the liquid crystal 50, the amount of incident light passing therethrough is increased. As a result, on the whole, light having contrast in accordance with the pixel signals S1, S2 . . . Sn is emitted from the electrooptic device 100.

In order to reduce or avoid leakage of the pixel signals S1, S2 . . . Sn thus retained, storage capacitance 60 may be provided in parallel with a liquid crystal capacitance formed between the pixel electrode 9a and the counter electrode. When the structure described above is used, the voltage of the pixel electrode 9a can be maintained for a long period of time, which is three orders of magnitude over a period of time in which a source voltage is applied, by the storage capacitance 60. Accordingly, charge retainability can be enhanced, and hence an electrooptic device 100 having high contrast ratio can be realized. As a method of forming the storage capacitance 60, a capacitor line 3b, which is a line to form the storage capacitance 60, may be used as shown in FIG. 3 by way of example, or the scanning line 3a described above may be used therefor.

Figure 4:
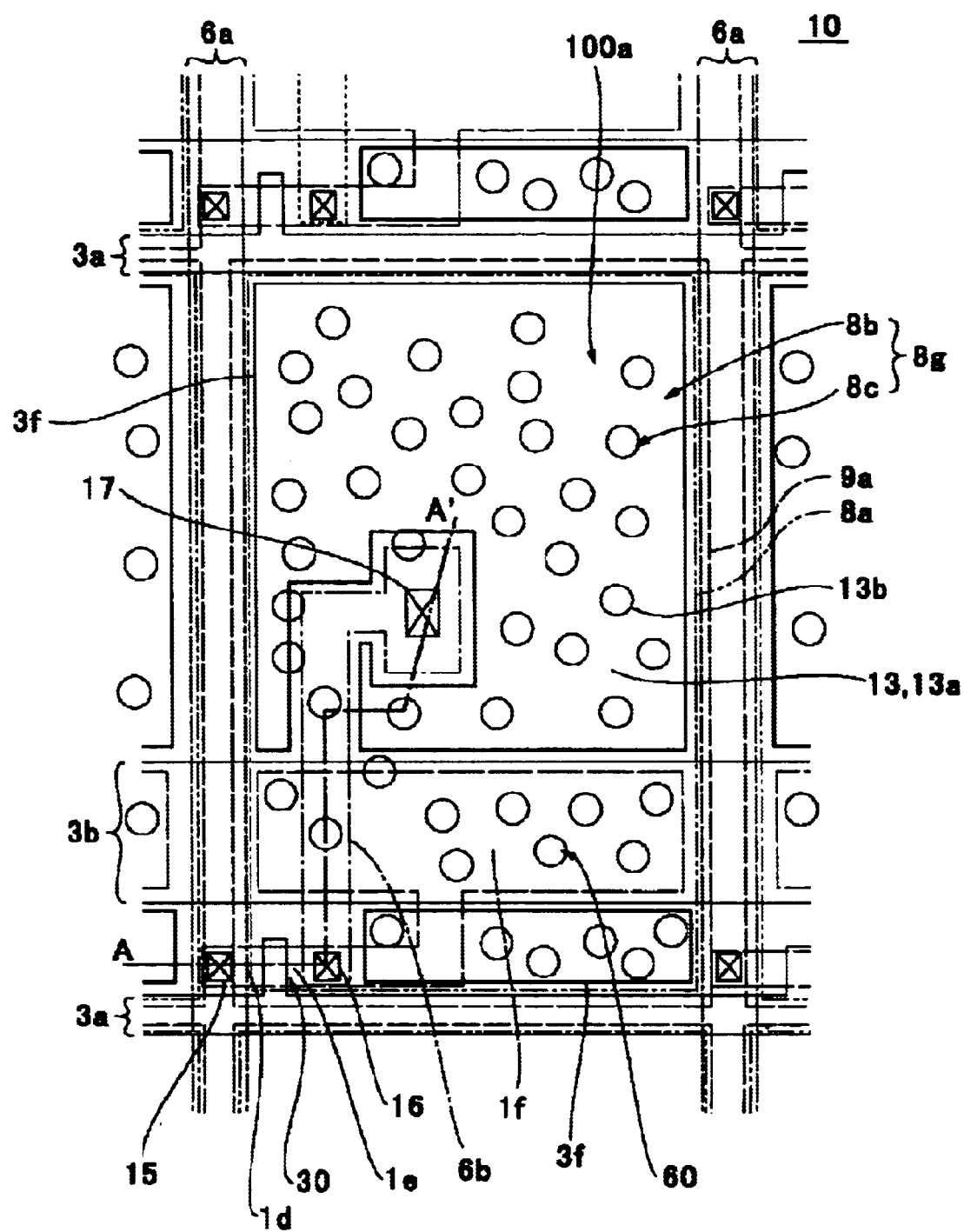
FIG. 4 is a plan view showing a pixel structure of a TFT array substrate of exemplary embodiment 1 according to the present invention.
Figure 5:
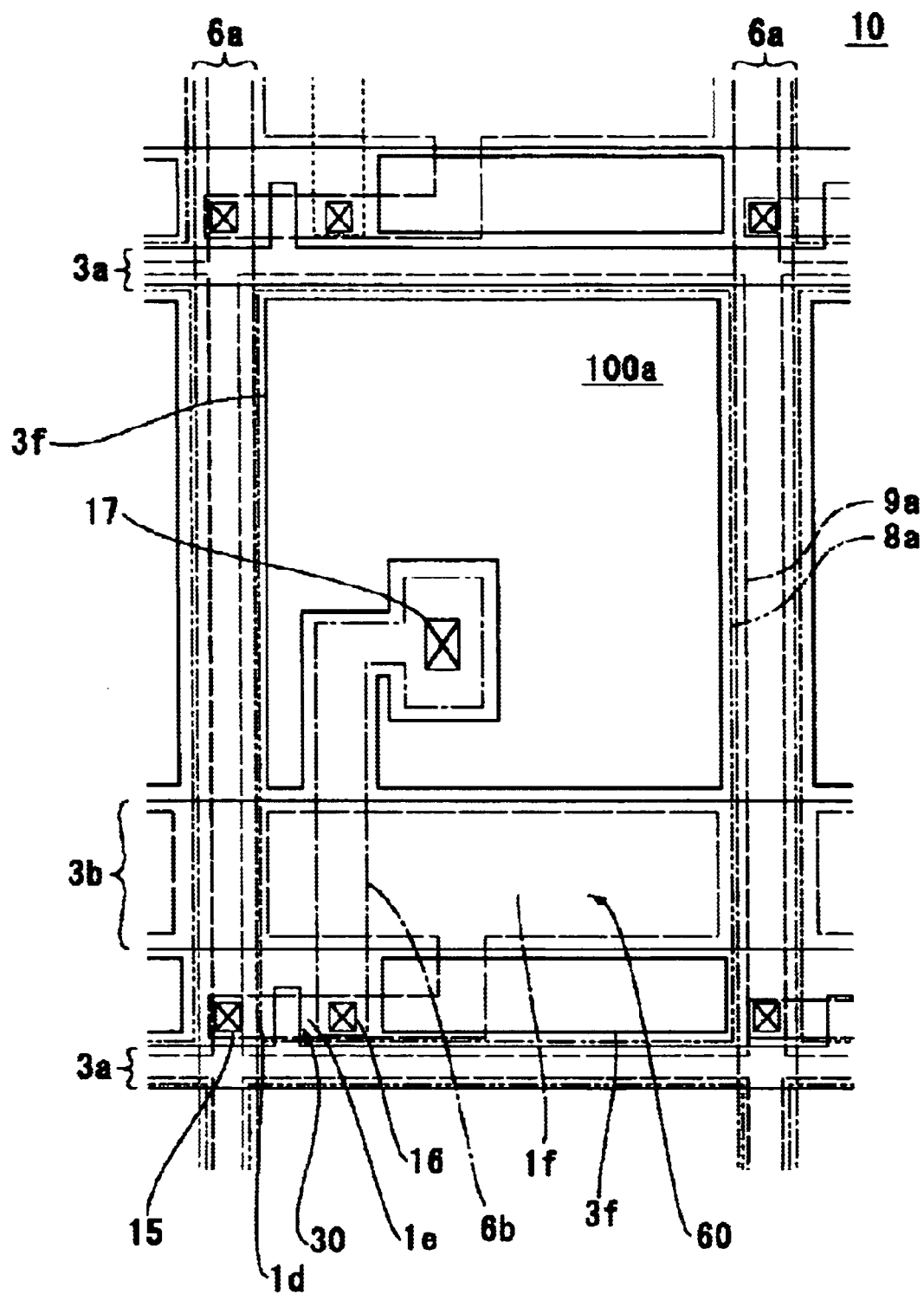
FIG. 5 is a plan view showing only wires and conductive films forming TFTs in the pixels of the TFT array substrate shown in FIG. 4.
Figure 6:
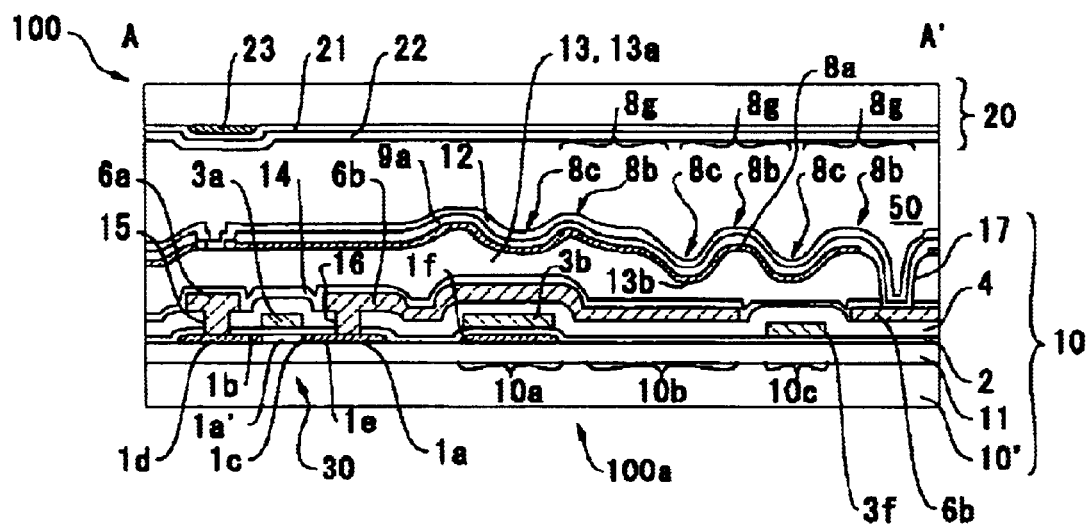
FIG. 6 is a cross-sectional view of the electrooptic device taken along plane A-A' shown in FIG. 4.
Figure 7:
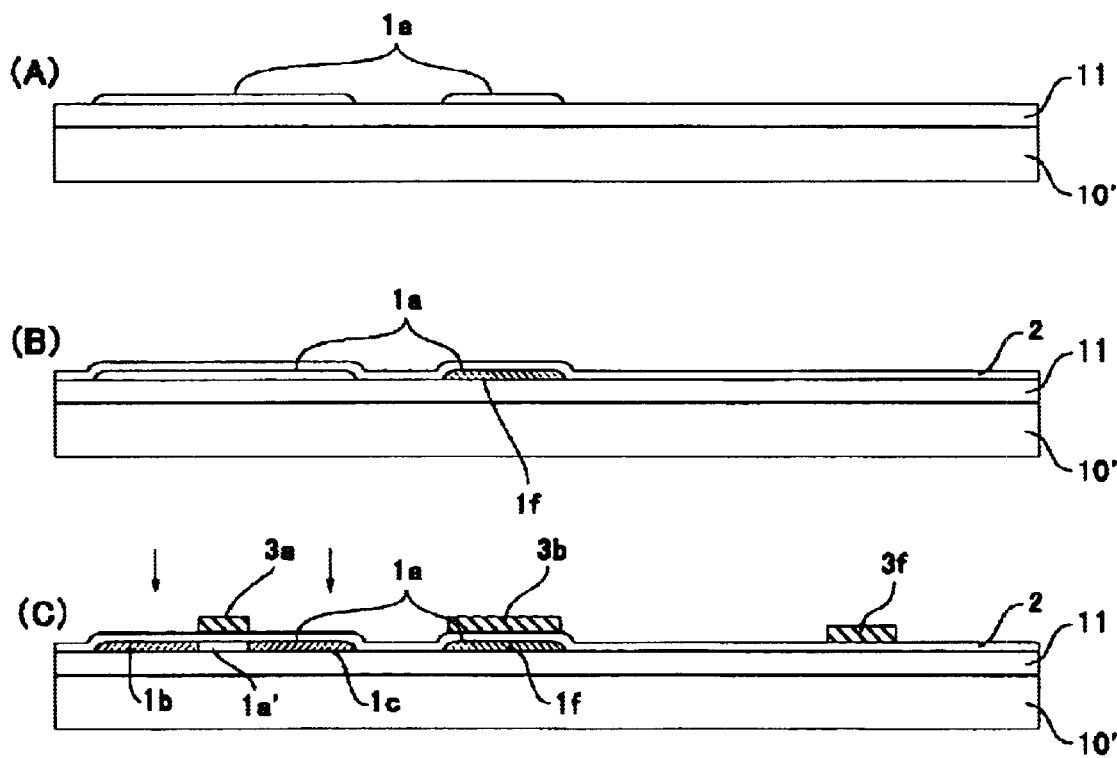
FIGS. 7(A) to (C) are cross-sectional views each showing a step of a manufacturing method for the TFT array substrate shown in FIG. 5.
Figure 8:
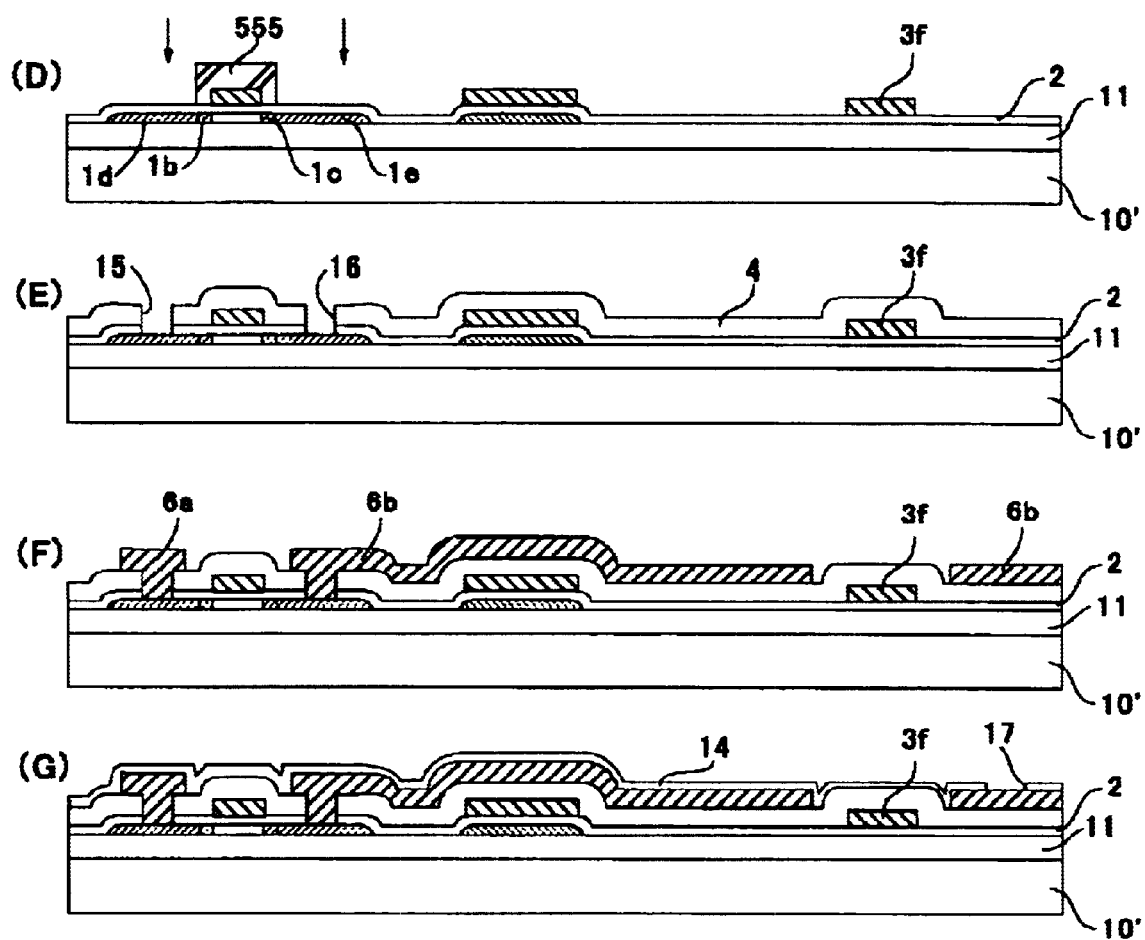
FIGS. 8(D) to (G) are cross-sectional views each showing a step of a manufacturing method for the TFT array substrate shown in FIG. 5.
Figure 9:
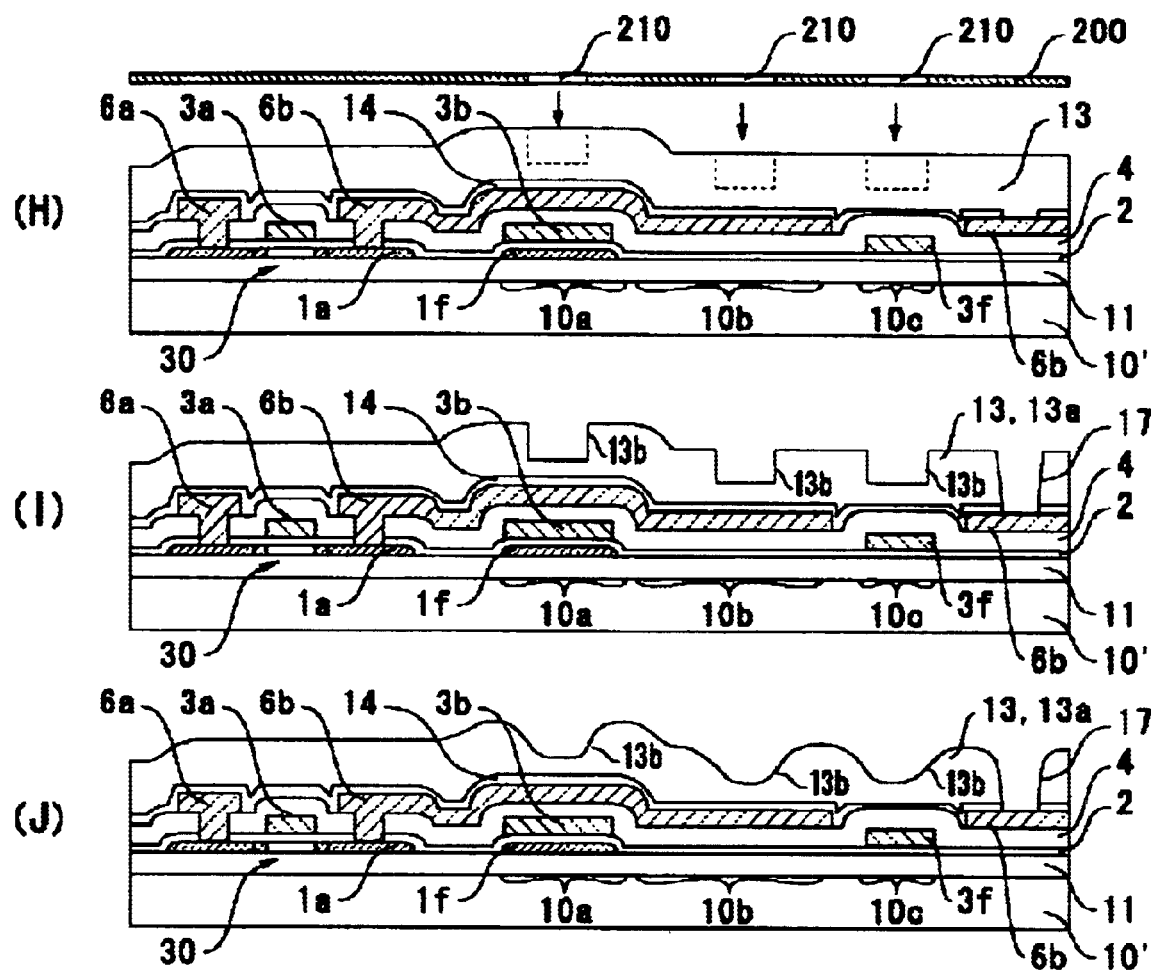
FIGS. 9(H) to (3J) are cross-sectional views each showing a step of a manufacturing method for the TFT array substrate shown in FIG. 5.
Figure 10:
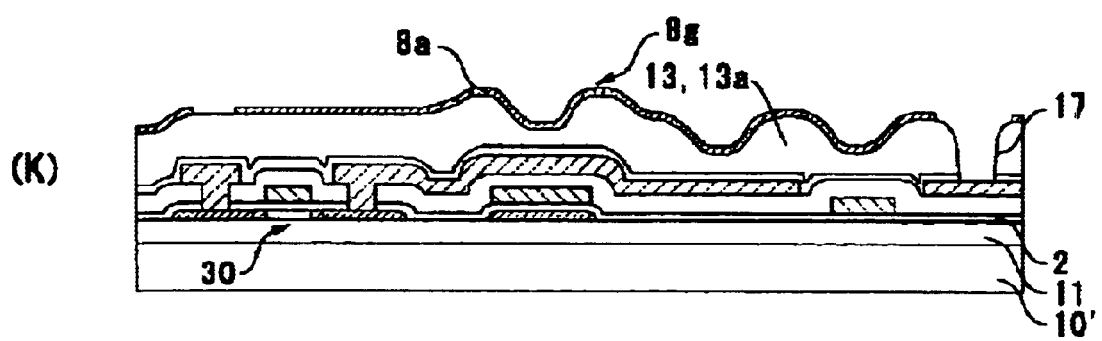
FIGS. 10(K) and (L) are cross-sectional views each showing a step of a manufacturing method for the TFT array substrate shown in FIG. 5.
Figure 10:
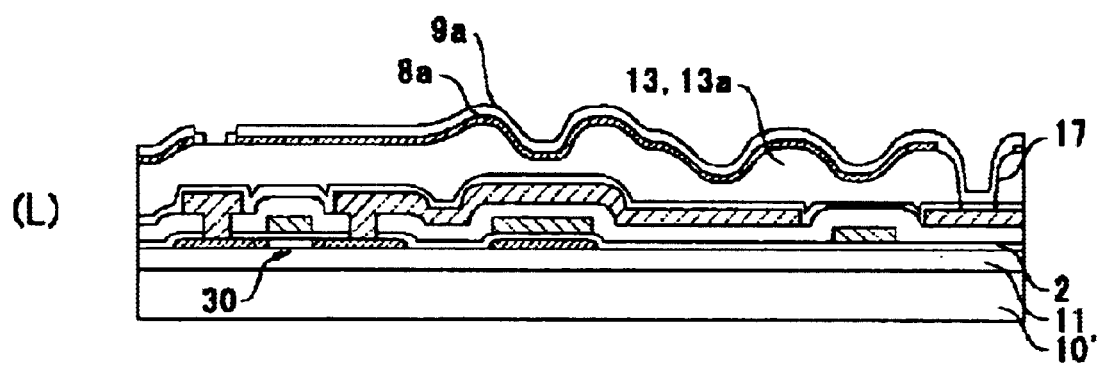

FIG. 4 is a plan view showing a plurality of adjoining pixels of a TFT array substrate used for the electrooptic device of this exemplary embodiment. FIG. 5 is a plan view showing only wires, such as scanning lines, data lines, and capacitor lines, and conductive films forming TFTs 30 in the pixels of the TFT array substrate shown in FIG. 4. In these figures, the heavy lines show characteristic portions of this exemplary embodiment. FIG. 6 is a cross-sectional view showing a part of the pixel of the electrooptic device taken along plane A-A' in FIG. 4.

In FIGS. 4 and 5, on the TFT array substrate 10, a plurality of the pixel electrodes 9a each composed of a transparent ITO (indium tin oxide) film is formed in a matrix, and the pixel switching TFTs 30 are connected to the respective pixel electrodes 9a. In addition, the data lines 6a, the scanning lines 3a, and the capacitance lines 3b are formed along the longitudinal and lateral boundaries of the pixel electrodes 9a, and the TFTs 30 are connected to the respective data lines 6a and scanning lines 3a. That is, the data lines 6a are each electrically connected to a heavily doped source region 1d of the TFT 30 through a contact hole 15, and a projecting portion of each of the scanning lines 3a forms a gate electrode of the TFT 30. In this exemplary embodiment, the storage capacitance 60 has the structure in which an extending portion 1f of a semiconductor film 1a to form the pixel switching TFT 30 is processed to have conductivity for use as a lower electrode 41, and the capacitance line 3b used as an upper electrode is provided over this lower electrode 41.

In the cross-sectional view of the pixel region having the structure described above, which is taken along plane A-A', as shown in FIG. 6, on a substrate 10' used as a base body of the TFT array substrate 10, an underlying protection film 11 composed of a silicon oxide film (insulating film) 300 to 500 nm thick is formed, and on the surface of this underlying protection film 11, an island-shaped semiconductor film 1a having a thickness of 30 to 100 run is formed. On the surface of the semiconductor film 1a, a gate insulating film 2 composed of a silicon oxide film having a thickness of approximately 50 to 150 nm is formed, and on the surface of this gate insulating film 2, the scanning line 3a having a thickness of 300 to 800 nm is formed. In the semiconductor film 1a, a region opposing the scanning line 3a with the gate insulating film 2 provided therebetween is a channel region 1a'. At one side of this channel region 1a', a source region including a lightly doped source region 1b and the heavily doped source region 1d is formed, and at the other side, a drain region including a lightly doped drain region 1c and a heavily doped drain region 1e is formed.

On the front surface side of the scanning line 3a, an interlayer insulating film 4 composed of a silicon oxide film 300 to 800 nm thick is formed. On the surface of the interlayer insulating film 4, the data line 6a having a thickness of 300 to 800 mm is formed, and this data line 6a is electrically connected to the heavily doped source region 1d through the contact hole 15 formed in the interlayer insulating film 4. On the surface of the interlayer insulating film 4, a drain electrode 6b is provided which is formed simultaneously with the data line 6a, and this drain electrode 6b is electrically connected to the heavily doped drain region 1e through a contact hole 16 formed in the interlayer insulating film 4. In addition, on the surfaces of the data line 6a and the drain electrode 6b, a surface protection film 14 composed of a silicon nitride film 100 to 300 nm thick is formed.

On the surface of the surface protection film 14, an irregularity-forming layer 13a composed of a light-transmitting photosensitive resin is formed. In addition, on the surface of the irregularity-forming layer 13a, a light reflection film 8a composed of an aluminum film is formed. Accordingly, the irregularities of the irregularity-forming layer 13a are transferred to the surface of the light reflection film 8a, thereby forming an irregular pattern 8g.

In addition, on the upper layer of the light reflection film 8a, the pixel electrode 9a made of an ITO film is formed.

The pixel electrode 9a is directly provided on the surface of the light reflection film 8a and is electrically connected thereto. In addition, the pixel electrode 9a is electrically connected to the drain electrode 6b through a contact hole 17 formed in the irregularity-forming layer 13a and the surface protection film 14.

In this exemplary embodiment, the drain electrode 6b extends from a position overlapping the heavily doped source region 1e of the TFT 30 to approximately the center of the pixel region after intersecting the capacitance line 3b, and the drain electrode 6b and the corresponding pixel electrode 9a are electrically connected to each other at approximately the center of the pixel region through the contact hole 17.

On the front surface of the pixel electrode 9a, an alignment film 12 composed of a polyimide film is formed. This alignment film 12 is a polyimide film processed by rubbing treatment.

Since the capacitance line 3b used as the upper electrode opposes the extending portion 1f (lower electrode) extending from the heavily doped drain region 1e with an insulating film (dielectric film) provided therebetween, which insulating film is formed simultaneously with the gate insulating film 2, the storage capacitance 60 is formed.

In addition, the TFT 30 preferably has the LDD structure as described above. However, the offset structure may be formed in which implantation of dopant ions is not performed in regions corresponding to the lightly doped source region 1b and the lightly doped drain region 1c. In addition, the TFT 30 may be a self-aligned TFT in which dopant ions at a high concentration are implanted using the gate electrode (part of the scanning line 3a) as a mask to form heavily doped source and drain regions in a self-aligned manner.

In this exemplary embodiment, a single gate structure in which only one gate electrode (scanning line 3a) of the TFT 30 is provided between the source and the drain regions. However, at least two gate electrodes may be provided therebetween. In the case described above, the structure is formed in which the same signal is applied to the individual gate electrodes. When the TFT 30 is formed so as to have dual gates (double gates), triple gates, or the like, current leakage at the junctions between the channel and the source and drain regions can be reduced or prevented, and current in an OFF state can be reduced. When at least one of the gate electrodes is formed so as to have the LDD structure or the offset structure, off-current can be further decreased, and hence a reliable switching element can be obtained.

As shown in FIG. 6, in the TFT array substrate 10, the irregular pattern 8g provided with convex portions 8b and concave portions 8c is formed on the surface of the light reflection film 8a, and in this embodiment, as shown in FIG. 4, concave portions 13b of the irregularity-forming layer 13a and the concave portions 8c formed thereby are shown by circular shapes in plan view. However, the planar shapes of the concave portion 8c and the concave portion 13b of the irregularity-forming layer 13a are not limited to circular shapes, and various other shapes, such as oval or rectangular shapes, may also be used, for example.

When the irregular pattern 8g described above is formed, in each region which is at the lower layer side of the light reflection film 8a and which corresponds to the convex portion 8b of the irregular pattern 8g, the irregularity-forming layer 13a is formed of a light-transmitting photosensitive resin 13 so as to have a large thickness, and in each region corresponding to the concave portion 8c, the concave portion 13b of the irregularity-forming layer 13a is formed so as to have a small thickness. Accordingly, the surface of the light reflection film 8*a* formed on the upper layer side of the irregularity-forming layer 13*a* is provided with the irregular pattern 8*g* for light scattering.

In this exemplary embodiment, the surface of the irregularity-forming layer 13*a* has a gentle shape in which edges are not or substantially not present. Hence, even when the light reflection film 8*a* is provided directly on the upper layer of the irregularity-forming layer 13*a*, the gentle irregular pattern 8*g* having no edges is formed on the surface of the light reflection film 8*a*.

As described below, after a positive photosensitive resin 13 is applied, half exposure using an exposure mask, development, and heating are performed for the photosensitive resin 13, thereby forming the irregularity-forming layer 13*a* described above. Accordingly, in each region corresponding to the concave portion 8*c* of the irregular pattern 8*g*, since the photosensitive resin 13 forming the irregularity-forming layer 13*a* is partly exposed in the thickness direction and is then developed, the photosensitive resin 13 is not completely removed, and the remaining thin resin 13 forms the concave 13*b*. On the other hand, in each region corresponding to the convex portion 8*b* of the irregular pattern 8*g*, since the photosensitive resin 13 forming the irregularity-forming layer 13*a* is not exposed, the thick film remains as it was. In addition, since being melted by heat treatment after half exposure and development are performed, the photosensitive resin 13 has gentle irregularities in which angulate portions and edges are not present.

In the pixel 100*a* of the TFT array substrate 10, there are a first region 10*a* in which the extending portion 1*f* of the semiconductor film 1*a*, the capacitance line 3*b*, and the drain electrode 6*b* are provided so as to form a multilayer structure; a second region 10*b* in which the drain electrode 6*b* is formed, but the extending portion 1*f* of the semiconductor film 1*a* and the capacitance line 3*b* are not formed; and a third region 10*c* in which the extending portion 1*f* of the semiconductor film 1*a*, the capacitance line 3*b*, and the drain electrode 6*b* are not formed. In the third region 10*c* among the regions described above, the island-shaped step-eliminating films 3*f* each composed of the same layer as that for the capacitance line 3*b* and the scanning line 3*a* are formed at two locations. That is, in this exemplary embodiment, at the two opposing sides (regions in which the capacitance lines 3*b* and drain electrodes 6*b* are not formed) of the capacitance line 3*b*, the step-eliminating films 3*f* are formed. Accordingly, the height difference caused by the presence of the capacitance line 3*b* and the drain electrode 6*b* can be eliminated by the step-eliminating film 3*f*. In addition, each of the height differences between the first region 10 *a* and the second region 10*c* and between the first region 10*a* and the third regions 10*c* corresponds only to the thickness of the semiconductor film 1*a* (extending portion 1*f*), and since this height difference is very small, there are substantially no height differences among the first, the second, and the third regions 10*a*, 10*b*, and 10*c*.

On the counter substrate 20, a shading film 23, which is a so-called black matrix or black stripe, is provided in regions opposing the longitudinal and lateral boundary regions of the pixel electrodes 9*a* formed on the TFT array substrate 10, and on the upper layer side of the shading film 23, the counter electrode 21 composed of an ITO film is provided. In addition, at the upper layer side of the counter electrode 21, an alignment film 22 composed of a polyimide film is formed, and this alignment film 22 is a polyimide film processed by rubbing treatment.

In the reflective electrooptic device 100 having the structure thus described, since the light reflection film 8*a* is formed at the lower layer side of the pixel electrode 9*a*, incident light from the counter substrate 20 side is reflected from the TFT array substrate 10 side, and image is displayed by light emitted from the counter substrate 20 side (reflection mode).

In the TFT array substrate 10, since the capacitance line 3*b* and the gate electrode, which are composed of the same layer as that for the scanning line 3*a*, the semiconductor film 1*a* forming the TFT 30, the extending portion 1*f* thereof, and the drain electrode 6*b* composed of the same layer as that for the data line 6*a* are selectively formed, when the numbers of the conductive films are different from each other, the height difference corresponding to the film thickness is formed. Accordingly, in this exemplary embodiment, in the region in which the number of the conductive films is small, i.e., in the third region 10*c*, the step-eliminating film 3*f* composed of the same layer as that for the scanning line 3*a* and the capacitance line 3*b* is formed, and hence the height difference is eliminated at the lower layer side of irregularity-forming layer 13*a*. As a result, in the step described below, when exposure is performed for the photosensitive resin 13 to form the irregularity-forming layer 13*a*, in all regions, i.e., in the first region 10*a*, the second region 10*b*, and the third regions 10*c*, uneven exposure of the photosensitive resin 13 does not occur.

In addition, when the photosensitive resin 13 is applied to a region in which a height difference is present, a thin film of the photosensitive resin 13 is formed in a higher region, and a thick film thereof is formed in a lower region. Accordingly, after exposure and development are performed, when the photosensitive resin 13 is melted by heating to form the irregularity-forming layer 13*a* having gentle irregularities, since the thin film of the photosensitive resin 13 is formed in the higher region, the sag of the resin is small, and hence relatively large irregularities tend to be formed. In addition, since the thick film of the photosensitive resin 13 is formed in the lower region, the sag of the resin becomes large, and hence small irregularities tend to be formed. However, according to this exemplary embodiment, the problem described above can be addressed or solved.

In addition, when exposure is performed for a region in which a conductive film is partly provided, uneven exposure occurs by the presence and non-presence of light reflected from the conductive film and variation in intensity thereof. However, in this exemplary embodiment, since the conductive films are formed over almost the entire pixel 100*a*, uneven exposure does not occur. Furthermore, thermal conductivity in a region in which a conductive film is formed is different from that in a region in which a conductive film is not formed, and hence variation in temperature is liable to occur; however, when the conductive films are formed over almost the entire area, the variation in temperature can be reduced, and hence uniform curing rate of the photosensitive resin 13 can be obtained.

Hence, in this exemplary embodiment, since the irregularity-forming layer 13*a* can be formed as designed, the desired irregular pattern 8*g* can be formed on the surface of the light reflection film 8*a*.

In addition, when a height difference is present at the lower layer side of the pixel electrode 9*a*, the thickness of the liquid crystal 50 varies from region to region thereby. However, in this exemplary embodiment, since the height difference is eliminated, display quality can be enhanced.

In this exemplary embodiment, although being additionally formed, the step-eliminating film 3*f* is composed of the same layer as that for the scanning line 3*a* and the capacitance line 3b and, as a result, can be formed simultaneously therewith by performing no additional manufacturing steps.

Furthermore, in this exemplary embodiment, the irregularity-forming layer 13a in itself has a gently changing film thickness, and as a result, has gentle irregularities on the surface thereof. Accordingly, without providing an upper insulating film for eliminating edges formed on the surface of the irregularity-forming layer 13a, the gentle irregular pattern 8g having no edges to provide light scattering can be formed on the surface of the light reflection film 8a. Hence, as described below, when the irregularity-forming layer 13a is simply formed by performing exposure and development once for the photosensitive resin 13, the irregular pattern 8g having gentle irregularities can be formed on the surface of the fight reflection film 8a to provide light scattering, and as a result, the production efficiency of the electrooptic device 100 can be enhanced.

Furthermore, in this exemplary embodiment, since the pixel electrode 9a is provided on the upper layer of the light reflection film 8a, a high quality image can be displayed. That is, as the light reflection film 8a, a metal film is used, and in addition, a transparent conductive film such as an ITO film is used as the counter electrode 21 provided at the counter substrate 20 side. When the liquid crystal 50 is provided between electrodes formed of different materials, polarization orientation may occur in the liquid crystal 50 in some cases. However, when the pixel electrode 9a composed of an ITO film is formed at the upper layer of the light reflection film 8a so that the liquid crystal 50 is provided between the electrodes formed of the same material, the occurrence of the polarization orientation of the liquid crystal 50 can be reduced or prevented, and hence the quality of the image to be displayed can be enhanced.

In a process of manufacturing the electrooptic device 100 having the structure as described above, steps of manufacturing the TFT array substrate 10 are described with reference to FIGS. 7(A) to 10(L). FIGS. 7(A)–10(L) are each cross-sectional views of steps of a method of manufacturing the TFT array substrate 10 of this exemplary embodiment, and the cross-sectional views of these figures are each taken along plane A-A' in FIG. 4.

First, as shown in FIG. 7(A), the substrate 10' is prepared which is composed of a glass or the like and which is cleaned by ultrasonic cleaning or the like, and the underlying protection film 11 composed of a silicon oxide film 300 to 500 nm thick is then formed over the entire surface of the substrate 10' by a plasma CVD method under the condition in which the substrate temperature is in the range of from 150 to 450° C. As a source gas in this step, a mixture composed of monosilane and nitrous oxide, TEOS and oxygen, or disilane and ammonia may be used.

Next, on the surface of the underlying protection film 11, the island-shaped semiconductor film 1a (active layer) is formed. For this formation, after a semiconductor film composed of an amorphous silicon film 30 to 100 nm thick is formed on the entire surface of the substrate 10' by a plasma CVD method under the condition in which the substrate temperature is in the range of from 150 to 450° C., the amorphous semiconductor film is melted by laser irradiation for annealing and is then crystallized by a cooling and solidification step. In the steps described above, since the time for laser irradiation for each region is very short, and the area irradiated is very limited as compared to the entire substrate, the entire substrate is not simultaneously heated to a high temperature. Hence, even when a glass substrate is used as the substrate 10', deformation, breakage, or the like caused by heating does not occur. Next, a resist mask is formed on the surface of the semiconductor film using a photolithographic technique, and the semiconductor film is etched using this resist mask, thereby forming the island-shaped semiconductor film 1a. As a source gas to form the semiconductor film 1a, for example, disilane or monosilane may be used.

Next, as shown in FIG. 7(B), the gate insulating film 2 composed of a silicon oxide film 50 to 150 nm thick is formed over the entire surface of the substrate 10' at a temperature of 350° C. or less. As a source gas in this step, for example, a mixture of TEOS and oxygen may be used. The gate insulating film 2 formed in this step may be a silicon nitride film instead of a silicon oxide film.

Next, although not shown in the figure, the lower electrode to form the storage capacitance 60 with the capacitance line 3b is formed by ion implantation of a dopant into the extending portion 1f of the semiconductor film 1a using a predetermined resist mask.

Next, as shown in FIG. 7(C), the scanning line 3a (gate electrode) and the capacitance line 3b are formed. For this formation, after a conductive film composed of an aluminum film, a tantalum film, a molybdenum film, or an alloy film primarily composed of one of the metals mentioned above is formed over the entire surface of the substrate 10' by a sputtering method or the like so as to have a thickness of 300 to 800 nm, a resist mask is formed using a photolithographic technique, and the conductive film is then dry-etched using this resist mask.

In the steps described above, in this exemplary embodiment, the step-eliminating film 3f composed of the same layer as that for the scanning line 3a and the capacitance line 3b is formed separately therefrom so as to have an island shape.

Next, by using the scanning line 3a (gate electrode) as a mask, low-concentration dopant ions (phosphorus ions) are implanted at a dose of approximately $0.1 \times 10^{13}$ to $10 \times 10^{13}/cm^2$ into the sides of the pixel TFT portion and an N-channel TFT portion (not shown) of a drive circuit, thereby forming the lightly doped source regions 1b and the lightly doped drain regions 1c in a self-alignment manner using the scanning line 3a. In this step, since a part of the semiconductor film 1a located under the scanning line 3a is not implanted by the dopant ions, the part described above maintains the properties of the semiconductor film 1a in itself and is used as the channel region 1a'.

Next, as shown in FIG. 8(D), a resist mask 555 having a width larger than that of the scanning line 3a (gate electrode) is formed, and high-concentration dopant ions (phosphorus ions) are implanted at a dose of approximately $0.1 \times 10^{15}$ to $10 \times 10^{15}/cm^2$, thereby forming the heavily doped source region 1d and the heavily doped drain region 1e.

Instead of the dopant implantation steps described above, without performing implantation of a low concentration dopant, a high concentration dopant (phosphorus ions) may be implanted so as to form a source and a drain region of the offset structure in the state in which a resist mask having a width larger than that of the gate electrode is provided. In addition, of course, a source region and a drain region of the self-alignment structure may be formed by implanting a high concentration dopant using the scanning line 3a as a mask.

Although not shown in the figures, by the steps described above, the N-channel TFT portion of a peripheral drive circuit unit is formed. In addition, when a P-channel TFT portion of the peripheral drive circuit is formed, after the pixel portion and the N-channel TFT portion are covered with a resist for protection, boron ions are implanted at a dose of approximately $0.1 \times 10^{15}$ to $10 \times 10^{15}/\text{cm}^2$ using the gate electrode as a mask, thereby forming a source and a drain region of the P-channel in a self-alignment manner. In this step, as is the formation of the N-channel TFT portion, after a low concentration dopant (boron ions) is implanted at a dose of approximately $0.1 \times 10^{13}$ to $10 \times 10^{13}/\text{cm}^2$ to form lightly doped regions in a polysilicon film by using the gate electrode as a mask, a high concentration dopant (boron ions) may be implanted at a dose of approximately $0.1 \times 10^{15}$ to $10 \times 0^{15}/\text{cm}^2$ by using a mask having a width larger than that of the gate electrode so as to form a source region and a drain region of the LDD structure (lightly doped drain structure). In addition, without performing implantation of a low concentration dopant, a high concentration dopant (phosphorus ions) may be implanted so as to form a source and a drain region of the offset structure while a mask having a width larger than that of the gate electrode is provided. By these ion implantation steps described above, the CMOS structure can be formed, and the peripheral drive circuit can be formed in the same substrate.

Next, as shown in FIG. 8(E), after the interlayer insulating film 4 composed of silicon oxide having a thickness of 300 to 800 nm is formed at the front surface side of the scanning line 3a by a CVD method or the like, a resist mask is formed using a photolithographic technique, and the contact holes 15 and 16 are formed in the interlayer insulating film 4 by etching using this resist mask. As a source gas for forming the interlayer insulating film 4, for example, a mixture of TEOS and an oxygen gas may be used.

Next, as shown in FIG. 8(F), the data line 6a and the drain electrode 6b are formed at the front surface side of the interlayer insulating film 4. For this formation, after a conductive film composed of an aluminum film, a tantalum film, a Molybdenum film, or an alloy film primarily composed of one of the metals mentioned above is formed by a sputtering method or the like so as to have a thickness of 300 to 800 nm, a resist mask is formed using a photolithographic technique, and the conductive film is dry-etched using this resist mask.

After the steps described above are finished, the surface of the TFT array substrate 10 has the structure as shown in FIG. 5.

Next, as shown in FIG. 8(G), on the data line 6a and the drain electrode 6b, the surface protection film 14 composed of a silicon nitride film having a thickness of 100 to 300 nm is formed. In this surface protection film 14, the contact hole 17 is also formed. However, this contact hole 17 may be formed in a subsequent step.

As shown in FIG. 9(H), after being applied to the surface of the surface protection film 14 by a spin coating method or the like, the positive photosensitive resin 13 is exposed using an exposure mask 200. In the exposure mask 200, regions corresponding to the concave portions 8c of the irregular pattern 8g, which were described with reference to FIGS. 4 and 5, are light-transmitting portions 210, and hence the region corresponding to the concave portions 8c of the irregular pattern 8g are selectively exposed. However, the exposure in this exemplary embodiment is performed for a short period of time as compared to that performed under general exposure conditions. Hence, the photosensitive resin 13 is partly exposed in the thickness direction thereof as shown by the dotted lines.

Next, as shown in FIG. 9(I), development of the photosensitive resin 13 is performed, and exposed parts thereof are removed. As a result, the concave portions 13b are formed in the regions (exposed regions) corresponding to the concave portions 8c of the irregular pattern 8g, and the regions (non-exposed regions) corresponding to the convex portions 8b of the irregular pattern 8g remain thick.

When the exposure described above is performed, in the TFT array substrate 10, there are the first region 10a in which the extending portion 1f of the semiconductor film 1a, the capacitance line 3b, and the drain electrode 6b are provided so as to form a multilayer structure; the second region 10b in which the drain electrode 6b is formed, but the extending portion 1f of the semiconductor film 1a and capacitance line 3b are not formed; and the third region 10c in which the extending portion 1f of the semiconductor film 1a, the capacitance fine 3b, and the drain electrode 6b are not formed. Among the regions described above, in the third region 10c, the island-shaped step-eliminating films 3f each composed of the same layer as that for the capacitance line 3b and the scanning line 3a are formed. Accordingly, since a large height difference is not present among the first region 10a, the second region 10b, and the third region 10c, when exposure is performed for the photosensitive resin 13, uneven exposure does not occur in all the first region 10a, the second region 10b, and the third region 10c. In addition, since the conductive film is present at the lower layer side in each of the first region 10a, the second region 10b, and the third region 10c, uneven exposure caused by the presence and non-presence of light reflected from the conductive film and variation in intensity thereof does not occur. Hence, the depth of the photosensitive resin 13 thus exposed does not vary among the first region 10a, the second region 10b, and the third region 10c.

After the development of the photosensitive resin 13 is performed as described above, heat treatment is performed therefor, thereby melting the photosensitive resin 13. As a result, as shown in FIG. 9(J), the film thickness of the photosensitive resin 13 changes gently, and in accordance with this change in film thickness, the irregularity-forming layer 13a provided with gentle irregularities on the surface thereof is formed.

In the irregularity-forming layer 13a, the contact hole 17 electrically connecting the drain electrode 6b to the pixel electrode 9a must be formed. In order to form the contact hole 17 described above, for example, in the exposure step shown in FIG. 9(H), after changing the exposure mask 200, a method of exposing a part at which the contact hole 17 is to be formed may be performed for a longer exposure time.

Next, as shown in FIG. 10(K), the light reflection film 8a is formed on the surface of the irregularity-forming layer 13a. For this formation, after a metal film composed of aluminum or the like is formed on the surface of the irregularity-forming layer 13a, a resist mask is formed on the metal film using a photolithographic technique, and subsequently, the metal film is patterned using this resist mask.

Since the surface shape of the irregularity-forming layer 13a is transferred to the light reflection film 8a thus formed, the gentle irregular pattern 8g having no edges is formed on the surface of the light reflection film 8a.

Next, as shown in FIG. 10(L), the pixel electrode 9a is formed on the surface of the light reflection film 8a. For this formation, after an ITO film 40 to 200 nm thick is formed on the surface of the light reflection film 8a by a sputtering method or the like, a resist mask is formed using a photolithographic technique, and subsequently, the ITO film is patterned using this resist mask.

Subsequently, as shown in FIG. 6, a polyimide film (alignment film 12) is formed on the surface of the pixel electrode 9a. For this formation, after a polyimide vanish containing 5 to 10 wt % of polyimide or polyamide acid in a solvent, such as butyl cellusolve or N-methyl pyrrolidone, is applied by flexographic printing, heating to cure (baking) is performed. The polyimide film thus formed is then rubbed in a predetermined direction with a puff composed of a rayon-based cloth, thereby aligning the polyimide molecules in the vicinity of the surface in a predetermined direction. As a result, by the interaction between the liquid crystal molecules and the polyimide molecules, the liquid crystal molecules are aligned in a predetermined direction.

Figure 11:
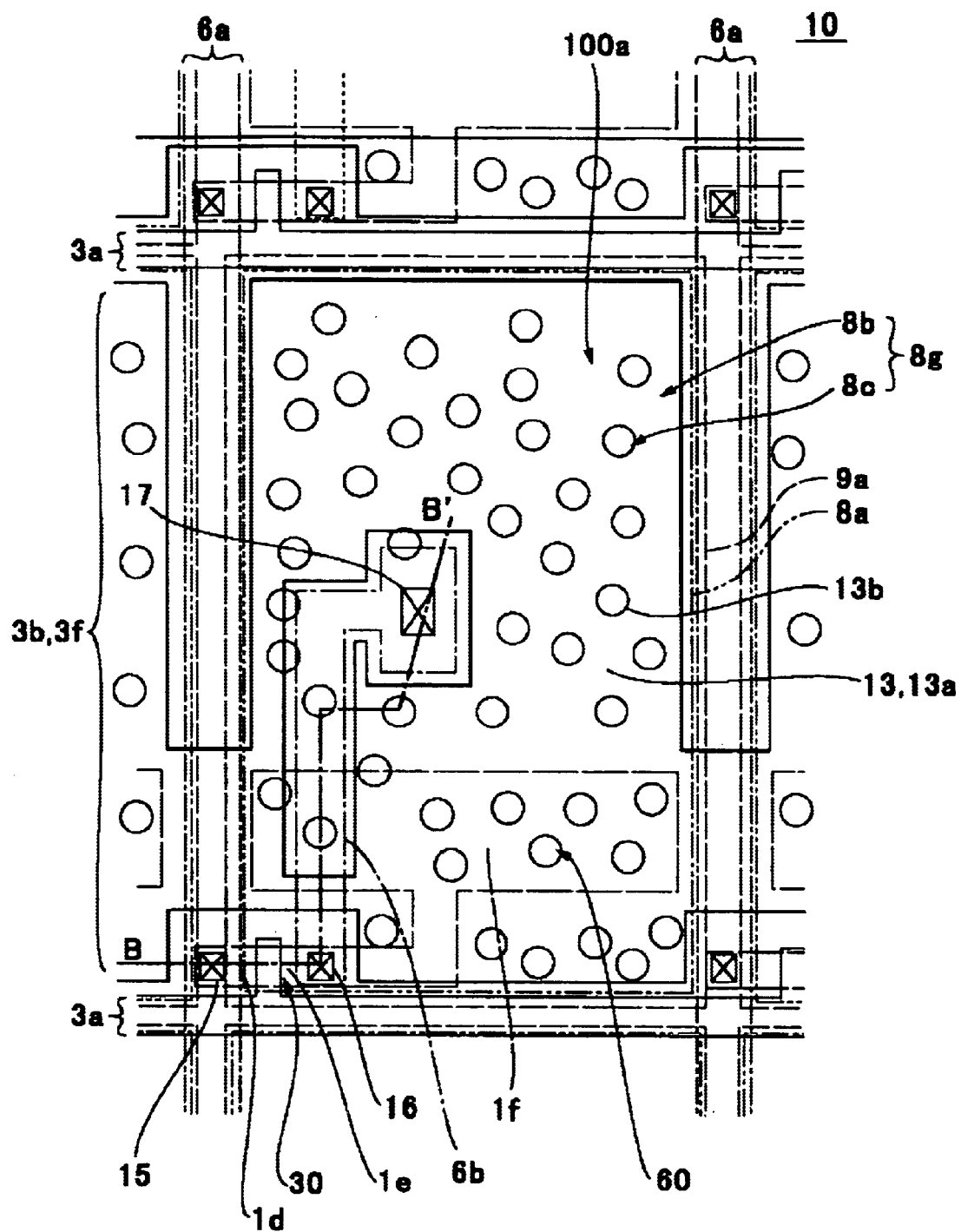
FIG. 11 is a plan view showing a pixel structure of a TFT array substrate of exemplary embodiment 2 according to the present invention.
Figure 12:
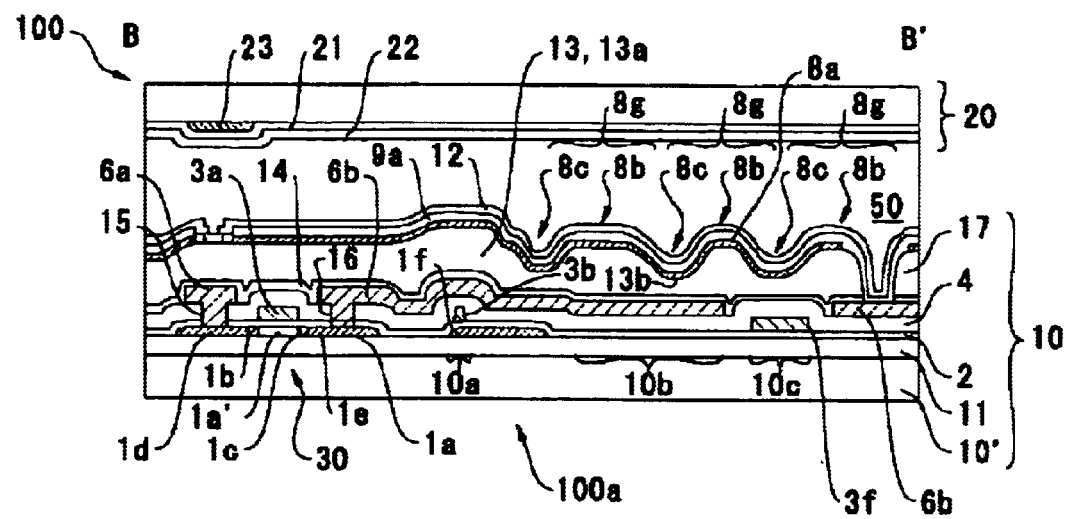
FIG. 12 is a cross-sectional view of the electrooptic device taken along plane B-B' shown in FIG. 11.

FIG. 11 is a plan view showing a plurality of adjoining pixels of a TFT array substrate of an electrooptic device according to exemplary embodiment 2. In this figure, the heavy lines show characteristic portions of this exemplary embodiment. FIG. 12 is a cross-sectional view showing a part of the pixel of the electrooptic device taken along plane B-B' in FIG. 11. Since the basic structure of the electrooptic device of this exemplary embodiment is equivalent to that of exemplary embodiment 1, the same reference numerals of exemplary embodiment 1 designate elements having the equivalent functions, and detailed descriptions thereof are omitted.

As shown in FIGS. 11 and 12, in the TFT array substrate 10 of this exemplary embodiment, the irregular pattern 8g provided with the convex portion 8b and the concave portions 8c is formed on the surface of the light reflection film 8a. Also in this exemplary embodiment, when the irregular pattern 8g described above is formed, in each region which is at the lower layer side of the light reflection film 8a and which corresponds to the convex portion 8b of the irregular pattern 8g, the irregularity-forming layer 13a is formed of the light-transmitting photosensitive resin 13 so as to have a large thickness, and in each region corresponding to the concave portion 8c, the concave portion 13b of the irregularity-forming layer 13a is formed so as to have a small thickness. Accordingly, the surface of the light reflection film 8a formed on the upper layer side of the irregularity-forming layer 13a is provided with the irregular pattern 8g for light scattering. In addition, the surface of the irregularity-forming layer 13a has a gentle shape in which edges are not present. Hence, even when the light reflection film 8a is provided directly on the upper layer of the irregularity-forming layer 13a, the gentle irregular pattern 8g having no edges is formed on the surface of the light reflection film 8a. As described in exemplary embodiment 1, for the formation of the irregularity-forming layer 13a described above, after the positive photosensitive resin 13 is applied, half exposure using an exposure mask, development, and heating are performed for this photosensitive resin 13.

In this exemplary embodiment, in the pixel 100a of the TFT array substrate 10, there are also the first region 10a in which the extending portion 1f of the semiconductor film 1a, the capacitance line 3b, and the drain electrode 6b are provided so as to form a multilayer structure; the second region 10b in which the drain electrode 6b is formed, but the extending portion 1f of the semiconductor film 1a and the capacitance line 3b are not formed; and the third region 10c in which the extending portion 1f of the semiconductor film 1a, the capacitance line 3b, and the drain electrode 6b are not formed. The step-eliminating film 3f extend from both sides of the capacitance line 3b toward the third region 10c among the regions described above. That is, in general, the capacitance line 3b has a striped shape and passes through the pixel region. However, in this exemplary embodiment, the capacitance line 3b and the step-eliminating film 3f are integrally formed over almost the entire pixel region 100a while covering the region of the drain electrode 6b as small as possible. Accordingly, a height difference caused by the presence of the capacitance line 3b and the drain electrode 6b can be eliminated or substantially eliminated by the step-eliminating film 3f, and as a result, there are no large height differences among the first region 10a, the second region 10b, and the third region 10c.

Furthermore, in this exemplary embodiment, at a portion at which the capacitance line 3b intersects the drain electrode 6b extending to the center of the pixel, since the capacitance line 3b is partly cut away, the part thereof overlapping the drain electrode 6b is very small. Accordingly, the first region 10a in which the extending portion 1f of the semiconductor film 1a, the capacitance line 3b, and the drain electrode 6b are provided so as to form a multilayer structure is very small. As a result, the entire surface of the pixel is almost covered with the second region 10b and the third region 10c, and hence no height difference is present therebetween.

In addition, when exposure is performed for a region in which a conductive film is partly provided, uneven exposure occurs which is caused by the presence and non-presence of light reflected from the conductive film and variation in intensity thereof. However, in this exemplary embodiment, since the conductive films are formed over almost the entire pixel region 100a, uneven exposure does not occur.

Hence, according to this exemplary embodiment, when the irregularity-forming layer 13a is formed by half exposure performed for the photosensitive resin 13, uneven exposure thereof does not occur in all the first region 10a, the second region 10b, and the third region 10c. Consequently, the irregularity-forming layer 13a can be formed as designed, and as a result, the desired irregular pattern 8g can be formed on the surface of the light reflection film 8a.

In this exemplary embodiment, although being additionally formed, the step-eliminating film 3f is composed of the same layer as that for the scanning line 3a and the capacitance line 3b and, as a result, can be formed simultaneously therewith by performing no additional manufacturing steps.

Figure 13:
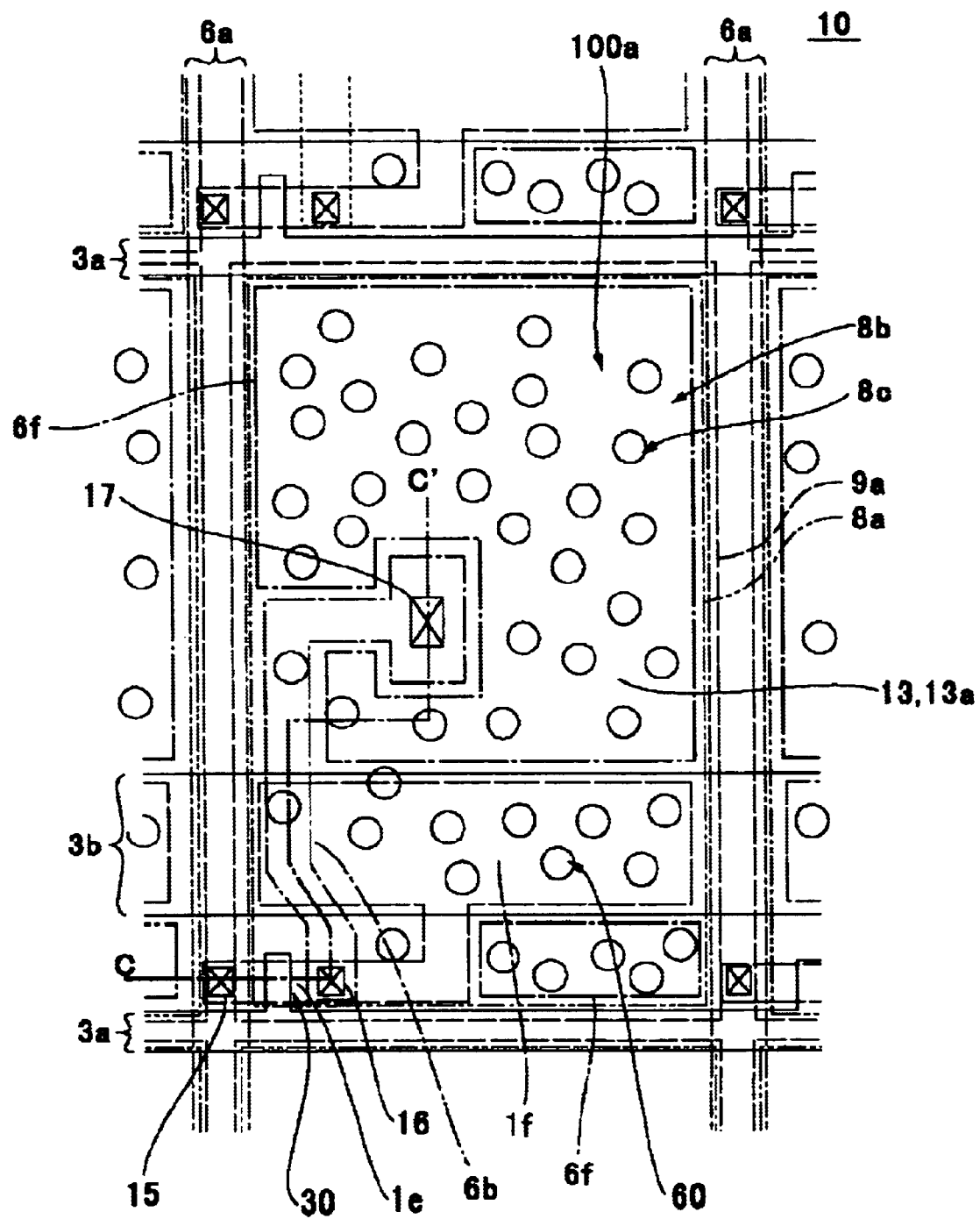
FIG. 13 is a plan view showing a pixel structure of a TFT array substrate of exemplary embodiment 3 according to the present invention.
Figure 14:
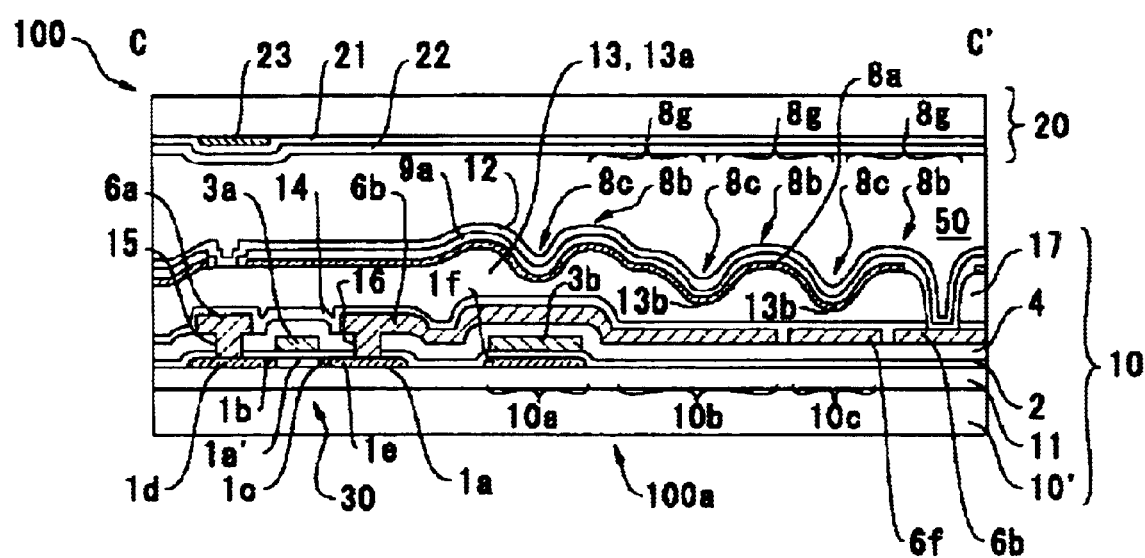
FIG. 14 is a cross-sectional view of the electrooptic device taken along plane C-C' shown in FIG. 13.

FIG. 13 is a plan view showing a plurality of adjoining pixels of a TFT array substrate of an electrooptic device according to exemplary embodiment 3. In this figure, the heavy lines show characteristic portions of this exemplary embodiment. FIG. 14 is a cross-sectional view showing a part of the pixel of the electrooptic device taken along plane C-C' in FIG. 13. Since the basic structure of the electrooptic device of this exemplary embodiment is equivalent to that of exemplary embodiment 1, the same reference numerals of exemplary embodiment 1 designate elements having the equivalent functions, and detailed descriptions thereof are omitted.

As shown in FIGS. 13 and 14, in the TFT array substrate 10 of this exemplary embodiment, the irregular pattern 8g provided with the convex portion 8b and the concave portions 8c is formed on the surface of the light reflection film 8a. When the irregular pattern 8g described above is formed, in each region which is at the lower layer side of the light reflection film 8a and which corresponds to the convex portion 8b of the irregular pattern 8g, the irregularity-formning layer 13a is formed of the light-transmitting photosensitive resin 13 so as to have a large thickness, and in each region corresponding to the concave portion 8c, the concave portion 13b of the irregularity-forming layer 13a is formed so as to have a small thickness. Accordingly, the surface of the light reflection film 8a formed on the upper layer side of the irregularity-forming layer 13a is provided with the irregular pattern 8g for light scattering. In addition, the surface of the irregularity-formning layer 13a has a gentle shape in which edges are not present. Hence, even when the light reflection film 8a is provided directly on the upper layer of the irregularity-forming layer 13a, the gentle irregular pattern 8g having no edges is formed on the surface of the light reflection film 8a. As described in exemplary embodiment 1, for the formation of the irregularity-forming layer 13a, after the positive photosensitive resin 13 is applied, half exposure using an exposure mask, development, and heating are performed for this photosensitive resin 13.

In this exemplary embodiment, in the pixel 100a of the TFT array substrate 10, the following are provided: the first region 10a in which the extending portion 1f of the semiconductor film 1a, the capacitance line 3b, and the drain electrode 6b are provided so as to form a multilayer structure; the second region 10b in which the drain electrode 6b is formed, but the extending portion 1f of the semiconductor film 1a and the capacitance line 3b are not formed; and the third region 10c in which the extending portion 1f of the semiconductor film 1a, the capacitance line 3b, and the drain electrode 6b are not formed. In the third region 10c among the regions described above, the island-shaped step-eliminating films 6f each composed of the same layer as that for the data line 6a and the drain electrode 6b are formed at two locations.

That is, in this exemplary embodiment, at the two opposing sides (region in which the capacitance lines 3b and drain electrodes 6b are not formed) of the capacitance line 3b, the step-eliminating films 6f are formed. Accordingly, the height difference caused by the presence of the capacitance line 3b and the drain electrode 6b can be eliminated or substantially eliminated by the step-eliminating film 6f, and hence there are substantially no height differences among the first region 10a, the second region 10b, and the third region 10c.

In addition, when exposure is performed for a region in which a conductive film is partly provided, uneven exposure occurs which is caused by the presence and non-presence of light reflected from the conductive film and variation in intensity thereof. However, in this exemplary embodiment, since the conductive films are formed over almost the entire pixel region 100a, uneven exposure does not occur.

According to this exemplary embodiment, when the irregularity-forming layer 13a is formed by half exposure performed for the photosensitive resin 13, uneven exposure thereof does not occur in all the first region 10a, the second region 10b, and the third region 10c. Hence, the irregularity-forming layer 13a can be formed as designed, and as a result, the desired irregular pattern 8g can be formed on the surface of the light reflection film 8a.

In addition, in this exemplary embodiment, although being additionally formed, the step-eliminating film 6f is composed of the same layer as that for the data line 6a and the drain electrode 6b and, as a result, can be formed simultaneously therewith by performing no or substantially no additional manufacturing steps.

Figure 15:
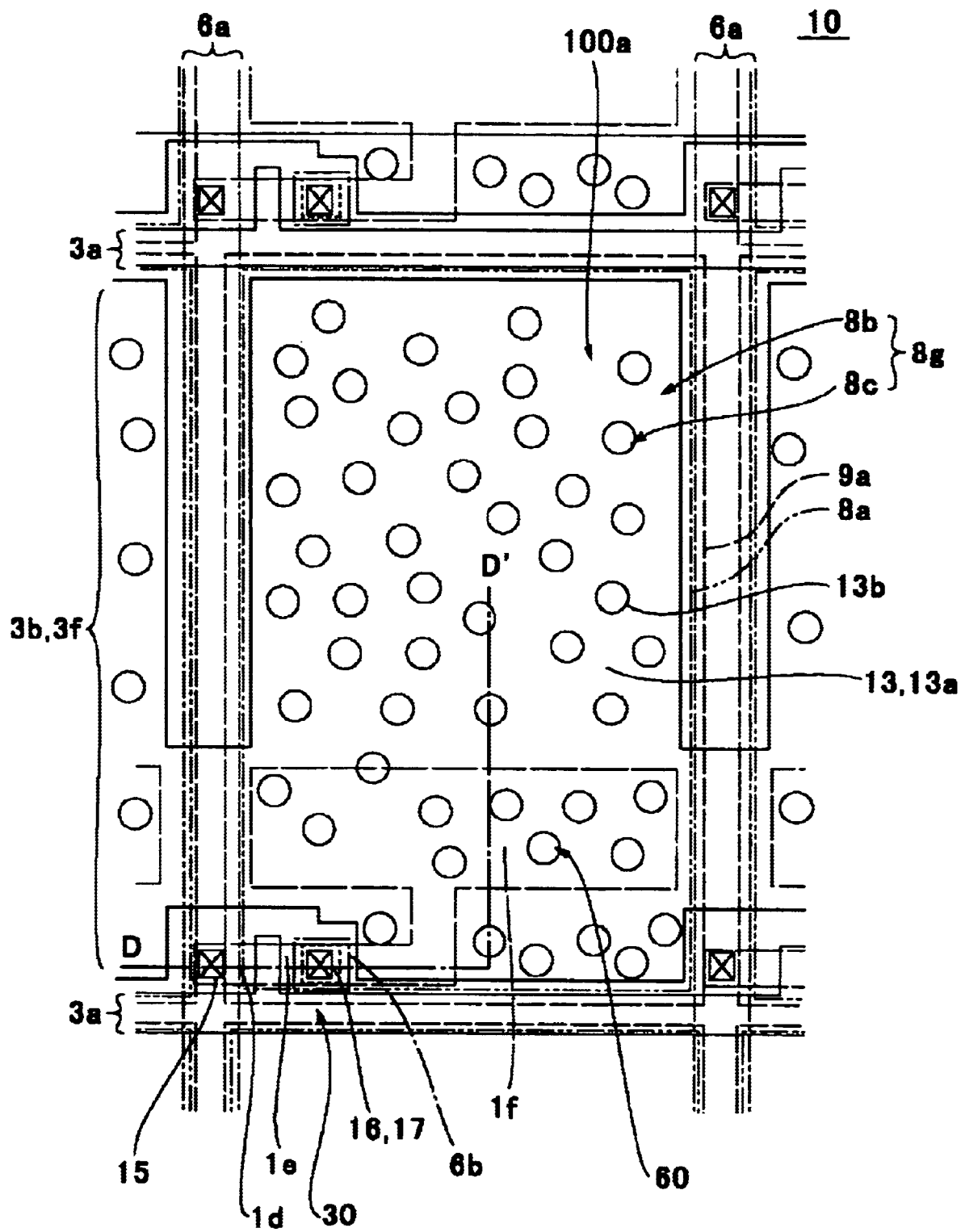
FIG. 15 is a plan view showing a pixel structure of a TFT array substrate of exemplary embodiment 4 according to the present invention.
Figure 16:
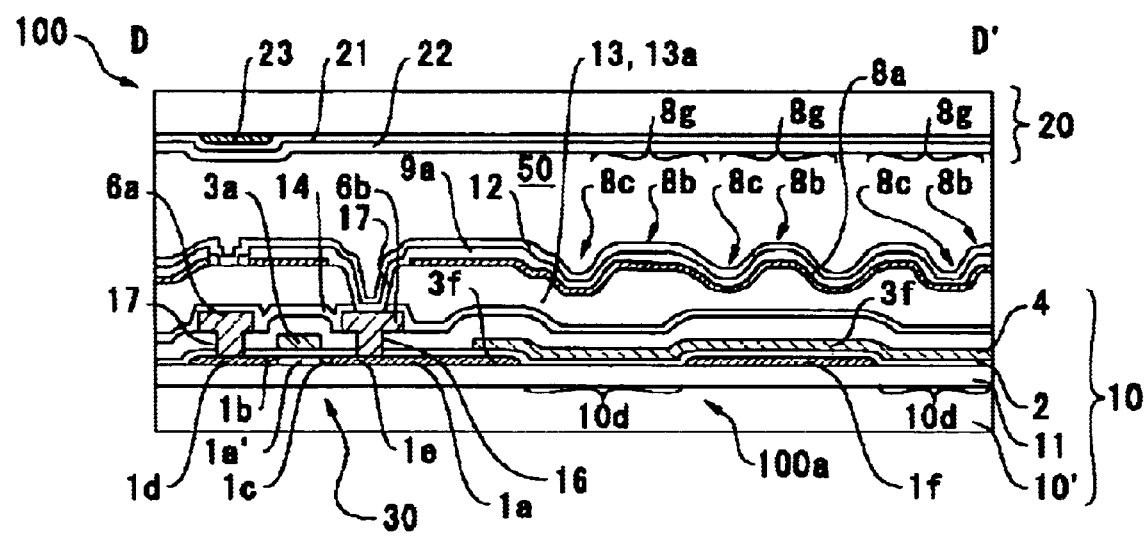
FIG. 16 is a cross-sectional view of the electrooptic device taken along plane D-D' shown in FIG. 15.

FIG. 15 is a plan view showing a plurality of adjoining pixels of a TFT array substrate of an electrooptic device according to exemplary embodiment 4. In this figure, the heavy lines show characteristic portions of this exemplary embodiment. FIG. 16 is a cross-sectional view showing a part of the pixel of the electrooptic device taken along plane D-D' in FIG. 15. Since the basic structure of the electrooptic device of this exemplary embodiment is equivalent to that of exemplary embodiment 1, the same reference numerals of exemplary embodiment 1 designate elements having the equivalent functions, and detailed descriptions thereof are omitted.

As shown in FIGS. 15 and 16, in the TFT array substrate 10 of this exemplary embodiment, the drain electrode 6b of the TFT 30 is electrically connected to the heavily doped drain region 1e through the contact hole 16 formed in the interlayer insulating film 4, and in addition, this drain electrode 6b is electrically connected to the pixel electrode 9a through the contact hole 17 which is formed at a position approximately overlapping the contact hole 16. Accordingly, in a manner different from that in exemplary embodiment 1, the drain electrode 6b is formed in a very small region and does not intersect the capacitance line 3b.

In this exemplary embodiment, the irregular pattern 8g provided with the convex portion 8b and the concave portions 8c is also formed on the surface of the light reflection film 8a. When the irregular pattern 8g described above is formed in this exemplary embodiment, in each region which is at the lower layer side of the light reflection film 8a and which corresponds to the convex portion 8b of the irregular pattern 8g, the irregularity-forming layer 13a is formed of the light-transmitting photosensitive resin 13 so as to have a large thickness, and in each region corresponding to the concave portion 8c, the concave portion 13b of the irregularity-forming layer 13a is formed so as to have a small thickness. Accordingly, the surface of the light reflection film 8a formed on the upper layer side of the irregularity-forming layer 13a is provided with the irregular pattern 8g for light scattering. In addition, the surface of the irregularity-forming layer 13a has a gentle shape in which edges are not present. Hence, even when the light reflection film 8a is provided directly on the upper layer of the irregularity-forming layer 13a, the gentle irregular pattern 8g having no edges is formed on the surface of the light reflection film 8a. As described in exemplary embodiment 1, for the formation of the irregularity-formning layer 13a, after the positive photosensitive resin 13 is applied, half exposure using an exposure mask, development, and heating are performed for this photosensitive resin 13.

In the TFT array substrate 10 of this exemplary embodiment, since the drain electrode 6b is formed in a very small region and does not intersect the capacitance line 3b, a region in which the capacitance line 3b and the drain electrode 6b are provided so as to form a multilayer structure is not present. In addition, the step-eliminating film 3f extends from the two sides of the capacitance line 3b toward regions in each of which both the drain electrode 6b and the capacitance line 3b are not formed. That is, in general, the capacitance line 3b has a strip shape and passes through the pixel region. However, in this exemplary embodiment, the capacitance line 3b and the step-eliminating film 3f are integrally formed over almost the entire pixel region while covering the region of the drain electrode 6b or the like as small as possible. Accordingly, the height difference caused by the presence of the capacitance line 3b can be eliminated by the step-eliminating film 3f, and hence there are no large height differences over the entire region.

In addition, when exposure is performed for a region in which a conductive film is partly provided, uneven exposure occurs which is caused by the presence and non-presence of light reflected from the conductive film and variation in intensity thereof. However, in this exemplary embodiment, since the conductive films are formed over almost the entire pixel region 100a, uneven exposure does not occur.

Accordingly, in this exemplary embodiment, when the irregularity-forming layer 13a is formed by half exposure performed for the photosensitive resin 13, uneven exposure thereof does not occur in all the regions described above. Hence, the irregularity-forming layer 13a can be formed as designed, and as a result, the desired irregular pattern 8g can be formed on the surface of the light reflection film 8a.

In addition, in this exemplary embodiment, although being additionally formed, the step-eliminating film 3f is composed of the same layer as that for the scanning line 3a and the capacitance line 3b and, as a result, can be formed simultaneously therewith by performing no or substantially no additional manufacturing steps.

Figure 17:
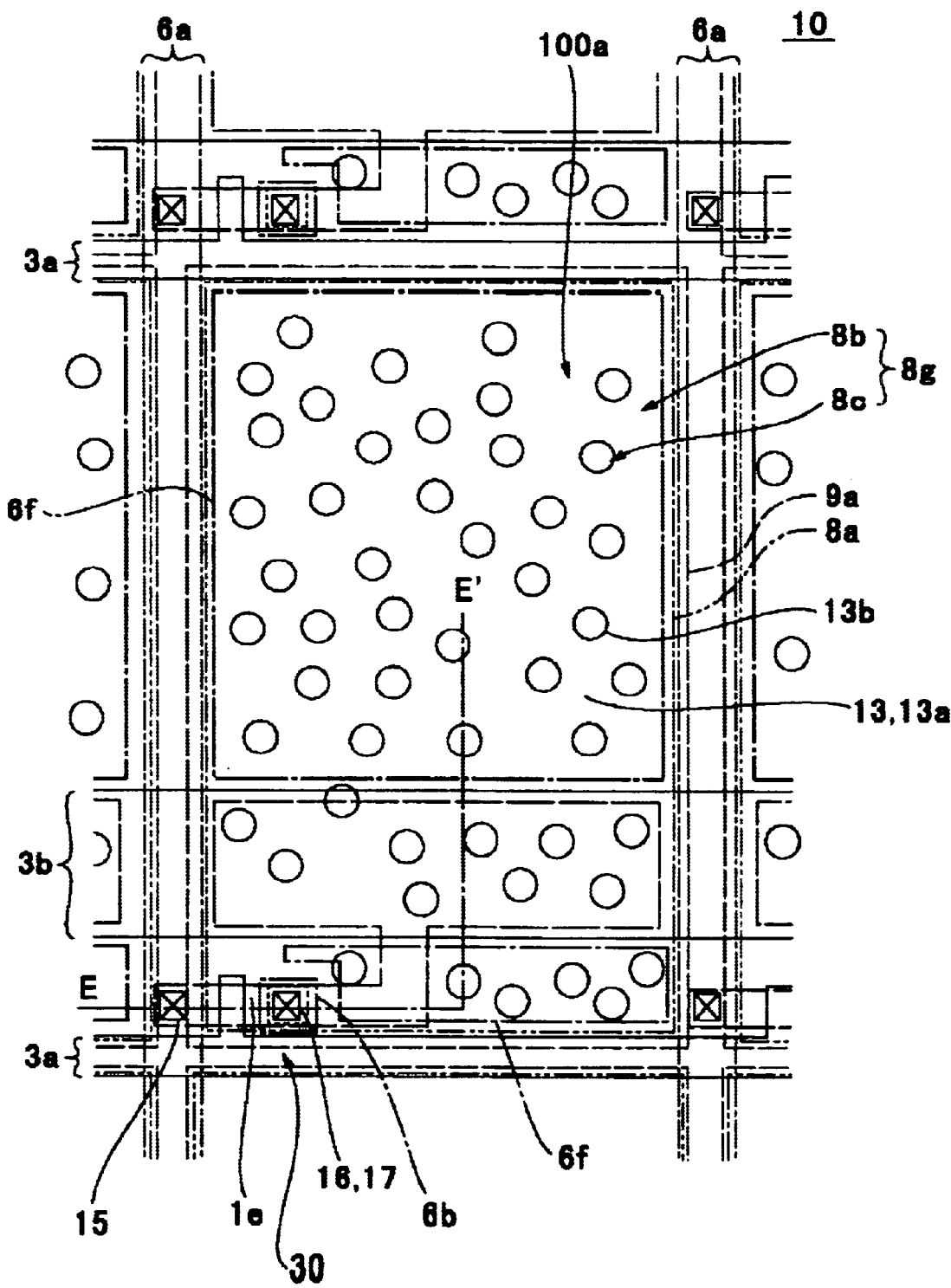
FIG. 17 is a plan view showing a pixel structure of a TFT array substrate of exemplary embodiment 5 according to the present invention.
Figure 18:
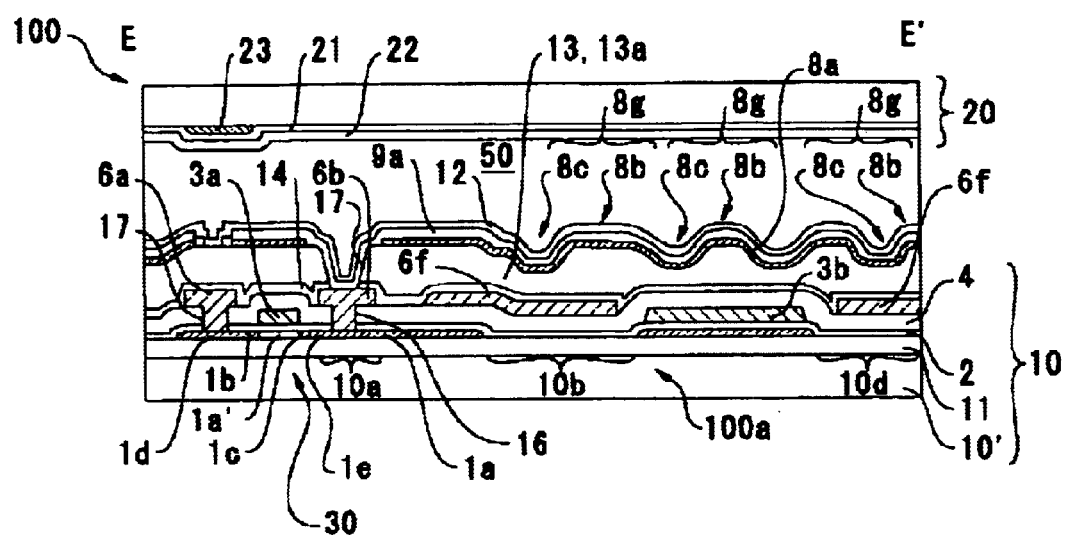
FIG. 18 is a cross-sectional view of the electrooptic device taken along plane E-E' shown in FIG. 17.

FIG. 17 is a plan view showing a plurality of adjoining pixels of a TFT array substrate of an electrooptic device according to exemplary embodiment 5. In this figure, the heavy lines show characteristic portions of this embodiment. FIG. 18 is a cross-sectional view showing a part of the pixel of the electrooptic device taken along plane E-E' in FIG. 17. Since the basic structure of the electrooptic device of this exemplary embodiment is equivalent to that of embodiment 1, the same reference numerals of exemplary embodiment 1 designate elements having the equivalent functions, and detailed descriptions thereof are omitted.

As shown in FIGS. 17 and 18, also in the TFT array substrate 10 of this exemplary embodiment, the drain electrode 6b of the TFT 30 is electrically connected to the heavily doped drain region 1e through the contact hole 16 formed in the interlayer insulating film 4, and in addition, this drain electrode 6b is electrically connected to the pixel electrode 9a through the contact hole 17 which is formed at a position approximately overlapping the contact hole 16. Accordingly, in a manner different from that in exemplary embodiment 1, the drain electrode 6b is formed in a very small region and, as a result, does not intersect the capacitance line 3b.

In this exemplary embodiment, the irregular pattern 8g provided with the convex portion 8b and the concave portions 8c is also formed on the surface of the light reflection film 8a. When the irregular pattern 8g described above is formed in this exemplary embodiment, in each region which is at the lower layer side of the light reflection film 8a and which corresponds to the convex portion 8b of the irregular pattern 8g, the irregularity-forming layer 13a is formed of the light-transmitting photosensitive resin 13 so as to have a large thickness, and in each region corresponding to the concave portion 8c, the concave portion 13b of the irregularity-forming layer 13a is formed so as to have a small thickness. Accordingly, the surface of the light reflection film 8a formed on the upper layer side of the irregularity-forming layer 13a is provided with the irregular pattern 8g for light scattering. In addition, the surface of the irregularity-forming layer 13a has a gentle shape in which edges are not present. Hence, even when the light reflection film 8a is provided directly on the upper layer of the irregularity-forming layer 13a, the irregular pattern 8g having no edges is formed on the surface of the light reflection film 8a. As described in embodiment 1, for the formation of the irregularity-forming layer 13a, after the positive photosensitive resin 13 is applied, half exposure using an exposure mask, development, and heating are performed for this photosensitive resin 13.

In the TFT array substrate 10 of this exemplary embodiment, since the drain electrode 6b is formed in a very small region and does not intersect the capacitance line 3b, a region in which the capacitance line 3b and the drain electrode 6b are provided so as to form a multilayer structure is not present. In addition, in a region 10d in which the drain electrode 6b and the capacitance line 3b are not formed, the step-eliminating films 6f each having an island shape are formed at two locations. That is, in this exemplary embodiment, at the two opposing sides (region in which the capacitance line 3b and drain electrode 6b are not formed) of the capacitance line 3b, the step-eliminating films 6f are formed. Accordingly, the height difference caused by the presence of the capacitance line 3b can be eliminated by the step-eliminating film 6f, and hence there are no large height differences over the entire region.

In addition, when exposure is performed for a region in which a conductive film is partly provided, uneven exposure occurs which is caused by the presence and non-presence of light reflected from the conductive film and variation in intensity thereof. However, in this exemplary embodiment, since the conductive films are formed over almost the entire pixel region 100a, uneven exposure does not occur.

Accordingly, in this exemplary embodiment, when the irregularity-forming layer 13a is formed by half exposure performed for the photosensitive resin 13, uneven exposure thereof does not occur in all the regions described above. Hence, the irregularity-forming layer 13a can be formed as designed, and as a result, the desired irregular pattern 8g can be formed on the surface of the light reflection film 8a.

In addition, in this exemplary embodiment, although being additionally formed, the step-eliminating film 6f is composed of the same layer as that for the data line 6a and the drain electrode 6b and, as a result, can be formed simultaneously therewith by performing no additional manufacturing steps.

Figure 19:
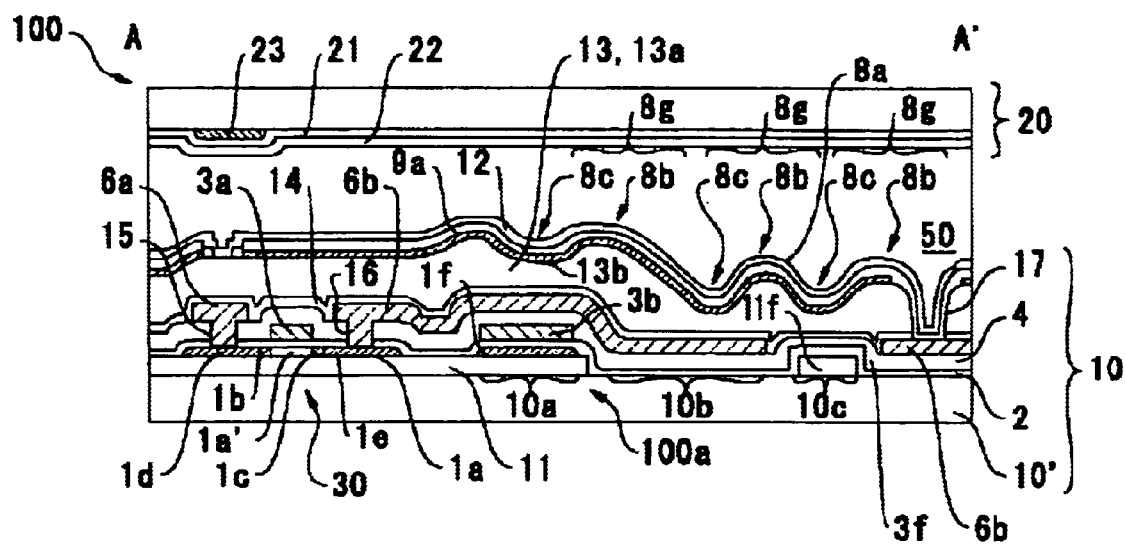
FIGS. 19(A) and (B) are cross-sectional views each showing an electrooptic device of exemplary embodiment 6 according to the present invention.
Figure 19:
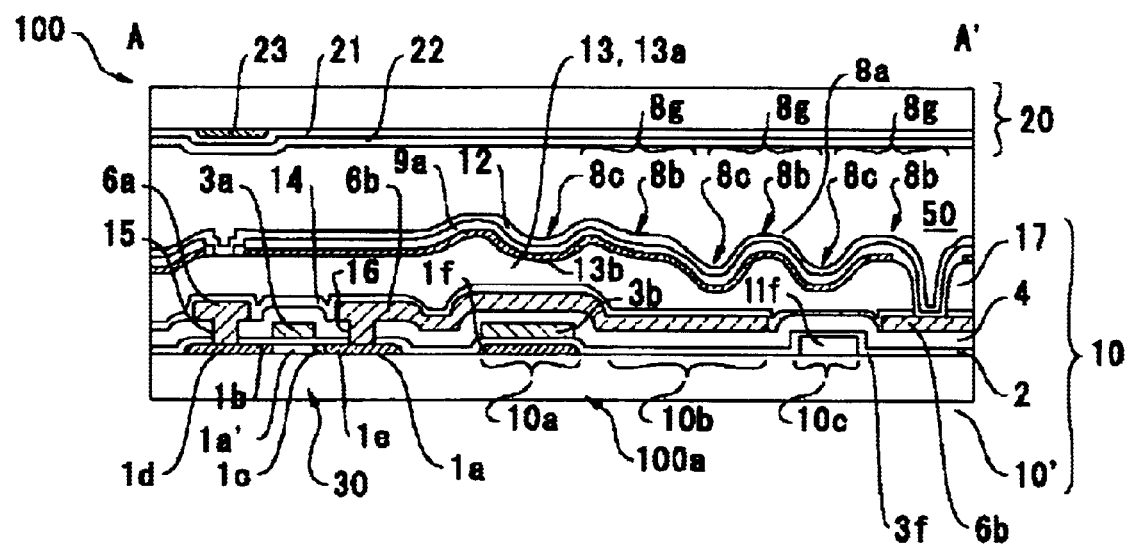

FIGS. 19(A) and (B) are cross-sectional views each showing a part of a pixel of an electrooptic device according to exemplary embodiment 6 of the present invention. Since the basic structure of the electrooptic device of this exemplary embodiment is equivalent to that of exemplary embodiment 1, the same reference numerals of exemplary embodiment 1 designate elements having the equivalent functions, and detailed descriptions thereof are omitted.

In exemplary embodiments 1 to 5, examples in which the conductive film is formed as the step-eliminating film are described, and in this exemplary embodiment, as shown in FIG. 19(A), an insulating film is used as the step-eliminating film.

That is, as is the case of exemplary embodiment 1, in this exemplary embodiment, the irregular pattern 8g provided with the convex portion 8b and the concave portions 8c is also formed on the surface of the light reflection film 8a. In addition, the capacitance line 3b and the gate electrode, which are composed of the same layer as that for the scanning line 3a, the semiconductor film 1a forming the TFT 30, the extending portion 1f thereof, and the drain electrode 6b composed of the same layer as that for the data line 6a are also selectively formed. Accordingly, when the numbers of the conductive films are different from each other, a height difference corresponding to the difference in the number of conductive films or to the thickness thereof is formed. In this exemplary embodiment, in a region in which the number of the conductive films is small, that is, in the third region 10c, the step-eliminating film 11f composed of the same layer as that for the underlying protection film 11 is formed, and on the other hand, in the second region 10b in which the number of the conductive films is larger than that in the third region 10c, an insulating film composed of the same layer as that for the underlying protection film 11 is not formed. As a result, between the second region 10b and the third region 10c, the height difference formed at the lower layer side of the irregularity-forming layer 13a is eliminated by the step-eliminating film 11f.

Accordingly, when the irregularity-forming layer 13a is formed by exposing the photosensitive resin 13, in all the first region 10a, the second region 10b, and the third region 10c, uneven exposure of the photosensitive resin 13 does not occur, and hence advantages in that the desired irregularity-forming layer 13a can be formed and the like, which are approximately equivalent to those in exemplary embodiment 1, can be obtained.

Since the rest of the structure is equivalent to that in exemplary embodiment 1, the same reference numerals in exemplary embodiment 1 designate elements having the equivalent functions, and descriptions thereof are omitted.

In FIG. 19(A), the case is shown by way of example in which the insulating film composed of the same layer as that for the underlying protection film 11 is used as the step-eliminating film 11f. However, as shown in FIG. 19(B), in the case in which the underlying protection film 11 is not formed, an insulating film may be formed as the step-eliminating film 11f. In addition, when the step-eliminating film is formed of an insulating film, for example, the interlayer insulating film 4 may be selectively formed.

Figure 20:
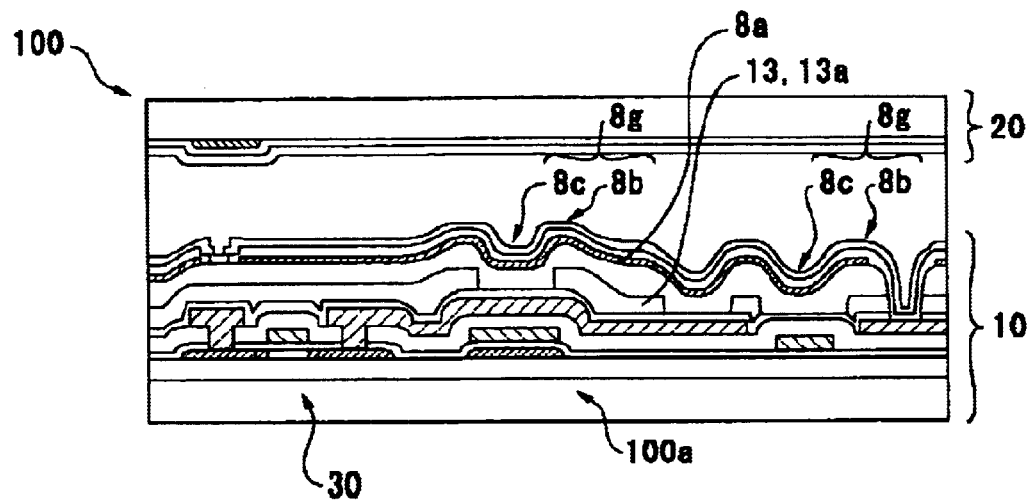
FIG. 20 is a cross-sectional view showing an electrooptic device of exemplary embodiment 7 according to the present invention.

FIG. 20 is a cross-sectional view showing a part of a pixel of an electrooptic device according to exemplary embodiment 7 of the present invention. Since the basic structure of the electrooptic device of this exemplary embodiment is equivalent to that of exemplary embodiment 1, the same reference numerals of exemplary embodiment 1 designate elements having the equivalent functions, and detailed descriptions thereof are omitted.

As shown in FIG. 20, in this exemplary embodiment, when the irregular pattern 8g provided with the convex portions 8b and the concave portions 8c is formed on the surface of the light reflection film 8a, after the photosensitive resin 13 is entirely exposed so as to selectively form the irregularity-forming layer 13a having a predetermined pattern, the irregular pattern 8g may be formed on the surface of the light reflection film 8a in accordance with the presence and non-presence of the irregularity-forming layer 13a. In the case described above, since edges are formed on the irregularity-forming layer 13a, an additional layer, i.e., an upper layer insulating film 7a is formed on the irregularity-forming layer 13a by applying a photosensitive resin having high fluidity, and subsequently, the light reflection film 8a is formed at the upper layer side of the upper layer insulating film 7a.

The present invention may also be applied to the exemplary embodiment described above. That is, although figures and description are omitted, when the height difference is present at the lower layer side of the irregularity-forming layer 13a, uneven exposure occurs, and hence one of the step-eliminating films described in exemplary embodiments 1 to 5 is formed.

Figure 21:
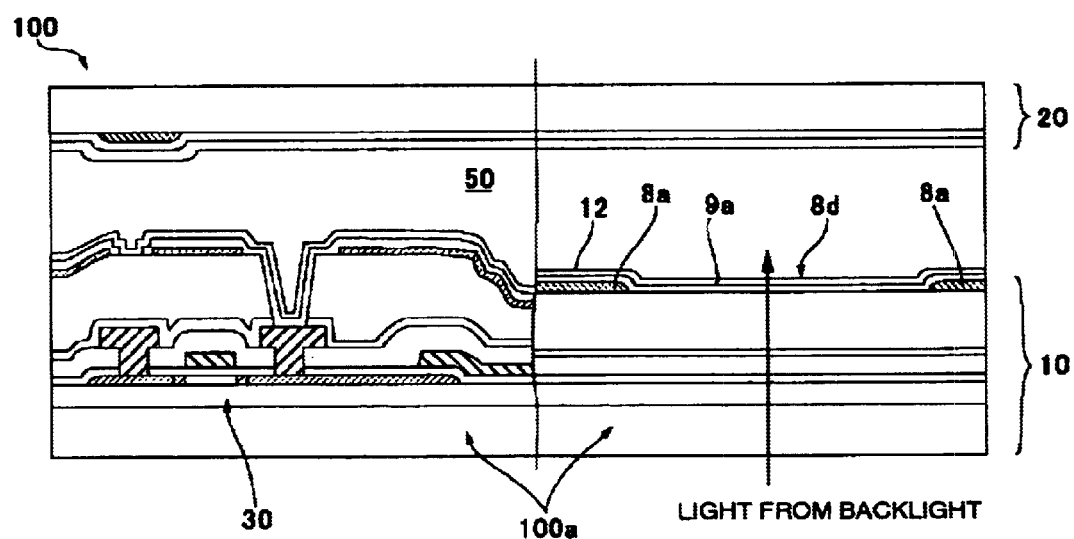
FIG. 21 is a cross-sectional view showing an electrooptic device of exemplary embodiment 8 according to the present invention.

FIG. 21 is a cross-sectional view showing a part of a pixel of an electrooptic device according to exemplary embodiment 8 of the present invention. Since the basic structure of the electrooptic device of this exemplary embodiment is equivalent to that of exemplary embodiment 1, the same reference numerals of exemplary embodiment 1 designate elements having the equivalent functions, and detailed descriptions thereof are omitted.

In exemplary embodiments 1 to 7, examples are described in which the reflective electrooptic device 100 in which the light reflection film 8a is formed over almost the entire pixel region. However, as shown in FIG. 21, when a light-transmitting window 8d is formed in the light reflection film 8a, and the irregularity-forming layer 13a is formed in a region other than that of the light-transmitting window 8d, a transflective electrooptic device 100 can be formed. That is, at position corresponding to that at which the light-transmitting window 8d is provided, the pixel electrode 9a composed of an ITO film is present, and the light reflection film 8a is not present. Accordingly, when a backlight device (not shown) is provided at the TFT array substrate 10 side, and light emitted from this backlight device is incident on the electrooptic device 100 described above from the TFT array substrate 10 side, light traveling to the light-transmitting window 8d, which is provided at the position at which the light reflection film 8a is not formed, passes through the light-transmitting window 8d to the counter substrate 20 side, thereby performing display (transmissive mode).

The present invention may also be applied to the exemplary embodiment described above. That is, although figures and description are omitted, when the height difference is present at the lower layer side of the irregularity-forming layer 13a, uneven exposure occurs, and hence one of the step-eliminating films described in exemplary embodiments 1 to 5 is formed. However, as described above, in the region of the light-transmitting window, it is preferable that the step-eliminating film is not formed.

In the exemplary embodiments described above, the pixel electrode 9a is formed at the upper layer side of the light reflection film 8a. However, when the polarization orientation of the liquid crystal 50 does not cause a problem, the pixel electrode 9a may be provided at the lower layer side of the light reflection film 8a.

In addition, in the case of the reflective electrooptic device 100, without forming the pixel electrode 9a, only the light reflection film 8a may be used as the pixel electrode.

Furthermore, in the embodiments described above, the example in which in which the TFT is used as a pixel switching active element is described. However, a thin-film diode element, (TFD element), such as an MIM (metal insulator metal) element, may also be used as an active element.

The reflective and transflective electrooptic devices 100 thus formed can be applied to display portions for various electronic apparatuses, and examples of the applications are described with reference to FIGS. 22–24.

Figure 22:
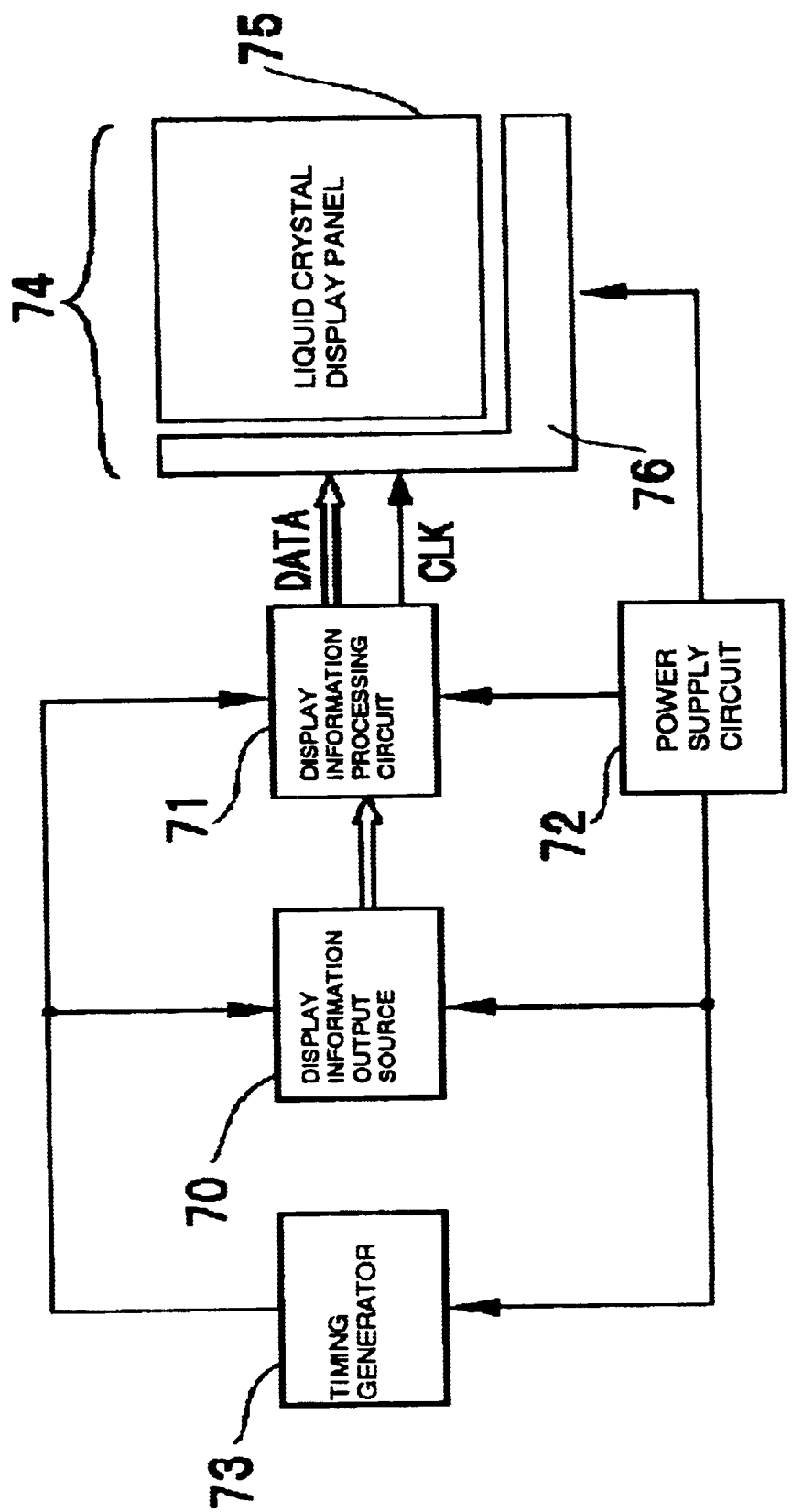
FIG. 22 is a schematic showing a circuit structure of an electronic apparatus using an electrooptic device of the present invention as a display device.

FIG. 22 is a schematic showing a circuit structure of an electronic apparatus using an electrooptic device of the present invention as a display device.

In FIG. 22, the electronic apparatus includes a display information output source 70, a display information processing circuit 71, a power supply circuit 72, a timing generator 73, and a liquid crystal device 74. In addition, the liquid crystal device 74 comprises a liquid crystal display panel 75 and a drive circuit 76. As the liquid crystal device 74, the electrooptic device 100 described above may be used.

The display information output source 70 includes storage units, such as memories including a ROM (read only memory) or a RAM (random access memory) and various discs, a tuning circuit to tune-output of digital image signals, and the like. In response to various clock signals generated by the timing generator 73, display information, such as an image signal of a predetermined format, is supplied to the display information processing circuit 71.

The display information processing circuit 71 includes various related art, later developed or known circuits, such as a serial-parallel converting circuit, an amplification polarity inverting circuit, a rotation circuit, a gamma correction circuit, and a clamping circuit. The display information processing circuit 71 processes input display information and then supplies an image signal thereof to the drive circuit 76 together with a clock signal CLK. The power supply circuit 72 supplies a predetermined voltage to the various constituent elements.

Figure 23:
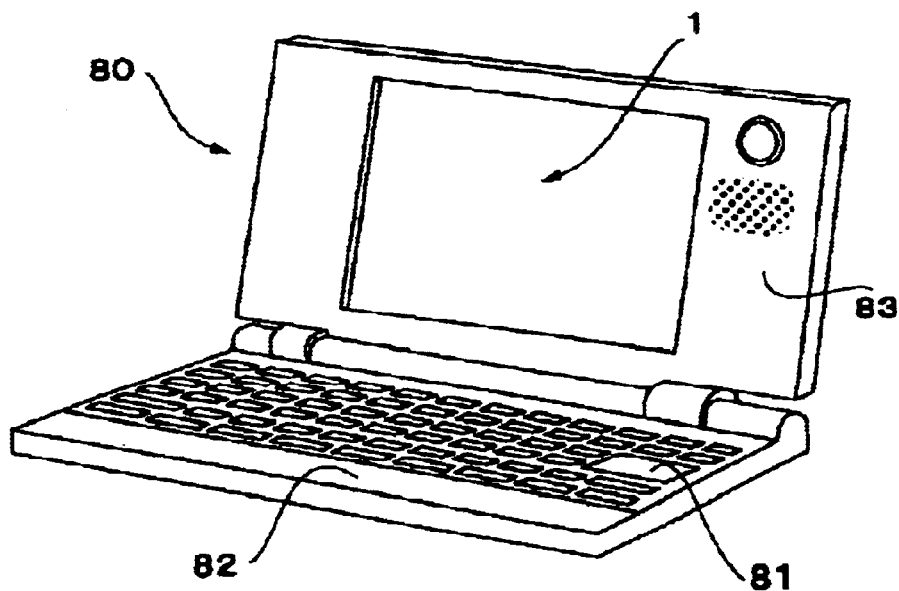
FIG. 23 is a schematic perspective view of a mobile personal computer which is an exemplary electronic apparatus using an electrooptic device of the present invention.

FIG. 23 shows a mobile personal computer according to one exemplary embodiment of an electronic apparatus of the present invention. A personal computer 80 in this exemplary embodiment has a main frame 82 provided with a keyboard 81 and a liquid crystal display unit 83. The liquid crystal unit 83 includes the electrooptic device 100 described above.

Figure 24:
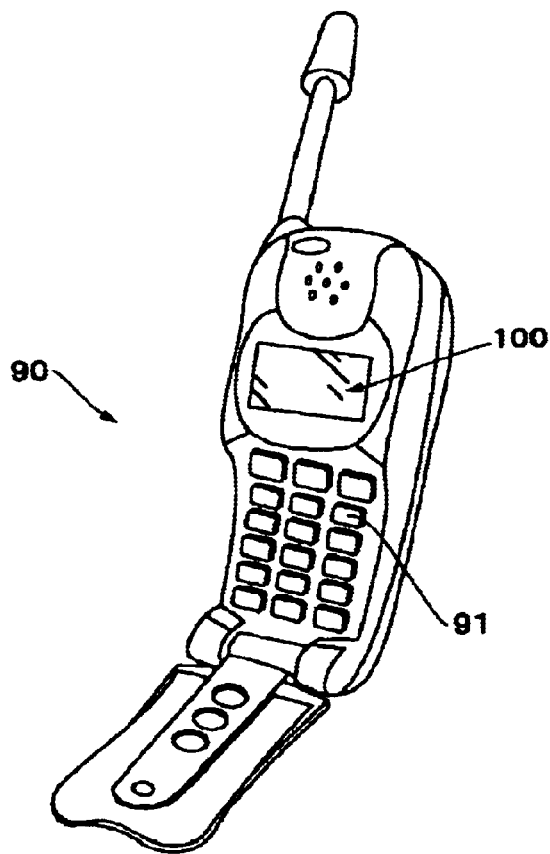
FIG. 24 is a schematic perspective view of a mobile phone which is an exemplary electronic apparatus using an electrooptic device of the present invention.
Figure 25:
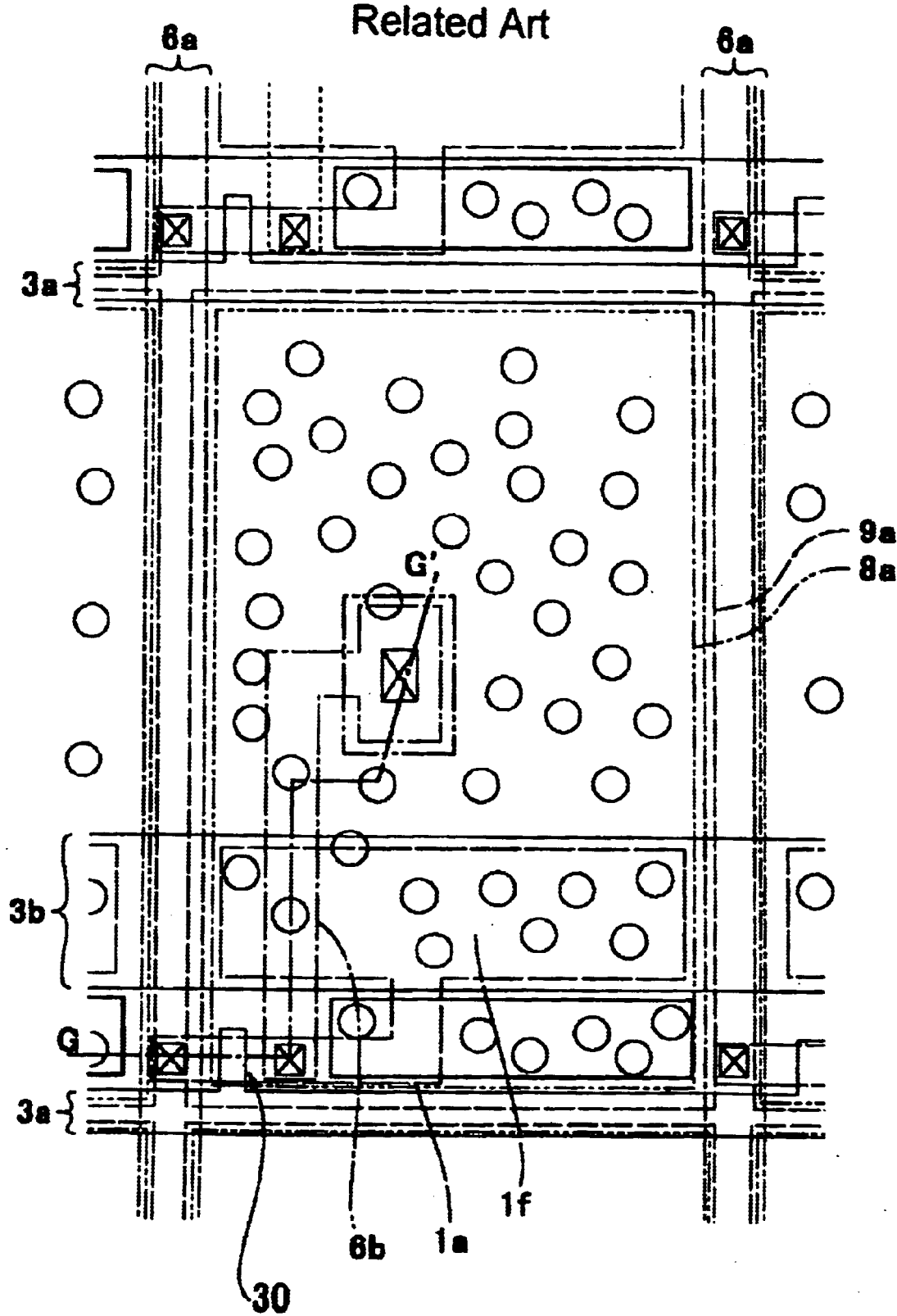
FIG. 25 is a plan view showing a pixel structure of a related art TFT array substrate.
Figure 26:
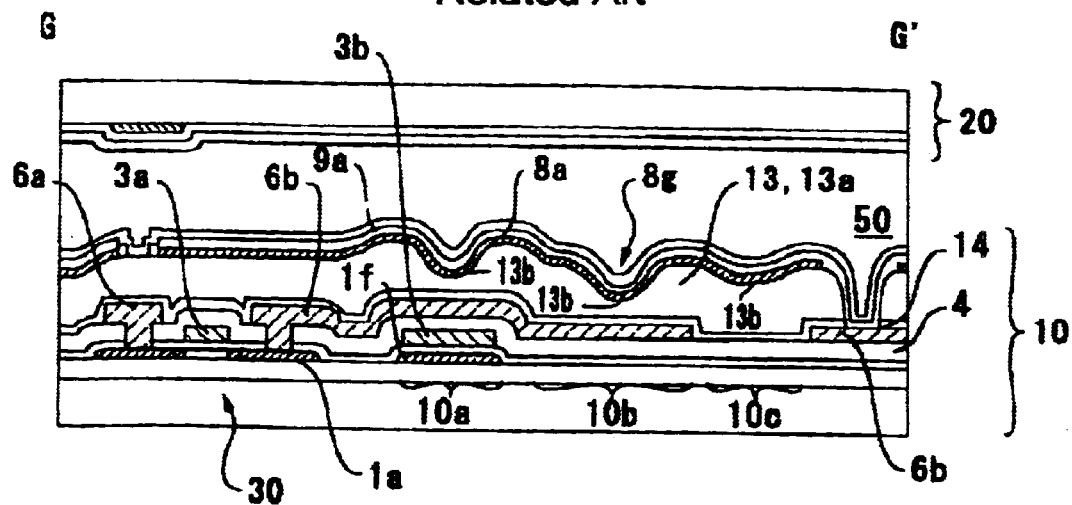
FIG. 26 is a cross-sectional view of the electrooptic device taken along plane G-G' shown in FIG. 25.
Figure 27:
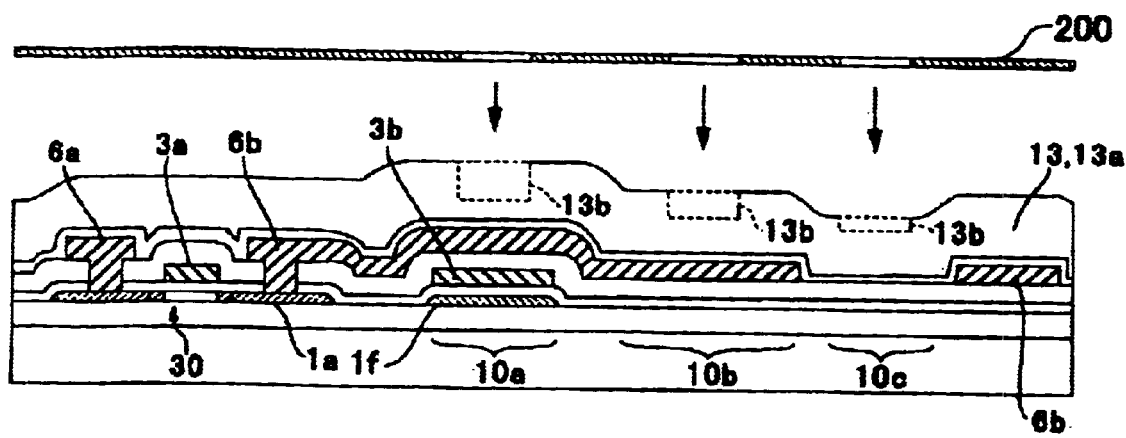
FIG. 27 is a cross-sectional view illustrating an exposure step to expose a photosensitive resin to form an irregularity-forming layer of a related art TFT array substrate.

FIG. 24 shows a mobile phone according to another exemplary embodiment of an electronic apparatus of the present invention. A mobile phone 90 in this exemplary embodiment has a plurality of operation buttons 91 and a display portion formed of the electrooptic device 100 described above.

As has thus been described, in a reflective electrooptic device, when the numbers of conductive films to form various wires and an active element are different from each other, height differences, i.e., steps corresponding to the film thickness thereof are formed. However, according to the reflective electrooptic device of the present invention, since the step-eliminating film is formed in a region in which the number of the conductive film is small, the height difference, i.e., the step is eliminated at the lower layer side of the irregularity-forming layer by this step-eliminating film. Accordingly, when the irregularity-forming layer is formed by exposing the photosensitive resin, since an apparent height difference is not present between a higher position and a lower position, uneven exposure does not occur. In addition, when a photosensitive resin is applied to a region in which a height difference is present, a thin film of the photosensitive resin is formed on a higher position, and on the other hand, a thick film of the photosensitive resin is formed on a lower position. Accordingly, when the photosensitive resin is melted by heating to form an irregularity-forming layer having gentle irregularities after being processed by exposure and development, the sag of the resin is small at the higher position since the film of the photosensitive resin is thin, and as a result, relatively large irregularities tend to be formed. However, according to the present invention, the problem described above can also be addressed or solved. Hence, since the irregularity-forming layer can be formed as designed, a desired irregular pattern can be formed on the surface of the light reflection film. In addition, since the step-eliminating film is formed of the same layer as that for the conductive film forming the wire, the conductive film forming the active element, or the insulating film, an additional manufacturing step is not or substantially not required when the step-eliminating film is formed. Furthermore, when a height difference is present at the lower side of the pixel electrode, the thickness of an electrooptic material layer composed of liquid crystal or the like varies from region to region. However, according to the present invention, the height difference is eliminated, and the display quality can also be enhanced.

What is claimed is:

1. A reflective electrooptic device, comprising:
   at least one substrate;
   an electrooptic material held by the substrate;
   an insulating film;
   a pixel switching active element which is composed of at least one conductive film, which is provided in each pixel on the substrate, and which is electrically connected to at least one wire composed of a conductive film;
   a light reflection film provided in each pixel on the substrate;
   an irregularity-forming layer provided in a region under the light reflection film to form a predetermined irregular pattern on a surface of the light reflection film; and
   at least one step-eliminating film formed in each pixel to substantially eliminate a height difference formed by the presence of the conductive film forming the active element, the step-eliminating film being provided in a region under the irregularity-forming layer and formed in a predetermined pattern shaped to compensate for a height difference caused by a region where the height of the conductive film forming the active element is different than the regions where the step-eliminating film is located, the step-eliminating film being composed of at least one of the conductive film forming the wire, the conductive film forming the active element, and the insulating film.

2. The reflective electrooptic device according to claim 1, the step-eliminating film being composed of the same layer as that for the conductive film forming the wire or the conductive film forming the active element and being formed simultaneously therewith.

3. The reflective electrooptic device according to claim 2, the step-eliminating film having an island shape formed separately from the conductive film forming the wire or the conductive film forming the active element.

4. The reflective electrooptic device according to claim 2, the step-eliminating film being formed of a conductive film extending from that to form the wire or that to form the active element.

5. The reflective electrooptic device according to claim 1, the step-eliminating film being selectively formed in a region in which the number of the conductive films forming the active element is smaller than in the regions where the step-eliminating film is not formed so as to substantially eliminate the height difference.

6. The reflective electrooptic device according to claim 1, the active element including a thin-film transistor connected to a scanning line and a data line, at least one of which is used as the wire, and
   the step-eliminating film including at least one of a conductive film which is composed of the same layer as that for the scanning line and is formed simultaneously therewith, and a conductive film which is composed of the same layer as that for the data line and is formed simultaneously therewith.

7. The reflective electrooptic device according to claim 1, further including a capacitance line in each pixel to form storage capacitance, the active element including a thin-film transistor connected to a scanning line and a data line, which are each used as the wire, and
   the step-eliminating film including at least one of a conductive film which is composed of the same layer as that for the scanning line and is formed simultaneously therewith, a conductive film which is composed of the same layer as that for the capacitance line and is formed simultaneously therewith, and a conductive film which is composed of the same layer as that for the data line and is formed simultaneously therewith.

8. The reflective electrooptic device according to claim 1, the irregularity-forming layer being composed of a photosensitive resin provided with irregularities thereon in conformity with gentle changes in film thickness, and the surface of the light reflection film being provided with an irregular pattern transferred from the irregularities provided on the surface of the irregularity-forming layer.

9. The reflective electrooptic device according to claim 8, the irregularity-forming layer being formed by half exposure performed for the photosensitive resin using an exposure mask and by development.

10. The reflective electrooptic device according to claim 1, the irregularity-forming layer being composed of a photosensitive resin formed selectively into a predetermined pattern, and the irregular pattern being formed on the surface of the light reflection film in accordance with the presence and non-presence of the irregularity-forming layer.

11. The reflective electrooptic device according to claim 10, the irregularity-forming layer being formed by exposure performed for the photosensitive resin using an exposure mask and by development.

12. The reflective electrooptic device according to claim 10, further including an upper insulating film on the irregularity-forming layer, the surface of the light reflection film being provided with the irregular pattern which is transferred from irregularities of the irregularity-forming layer via the upper insulating film.

13. The reflective electrooptic device according to claim 1, the irregularity-forming layer being provided over almost the entire area of each pixel.

14. The reflective electrooptic device according to claim 1, the light reflection film being provided with a light-transmitting window.

15. The reflective electrooptic device according to claim 1, the light reflection film being provided with a light-transmitting window, and the step-eliminating film being provided in a region other than that overlapping the light-transmitting window in plan view.

16. The reflective electrooptic device according to claim 1, the electrooptic material including liquid crystal.

17. An electronic apparatus, comprising:

the reflective electrooptic device according to claim 1 usable as a display device.

18. The electronic apparatus according to claim 17, the electrooptic material including liquid crystal.

19. A reflective electrooptic device, comprising:

at least one substrate;

an electrooptic material held by the substrate;

a pixel switching active element which is composed of at least one conductive film, which is provided in each pixel on the substrate, and which is electrically connected to at least one wire composed of a conductive film;

a light reflection film provided in each pixel on the substrate;

an irregularity-forming layer provided in a region under the light reflection film to form a predetermined irregular pattern on a surface of the light reflection film; and at least one island-shaped pattern which is provided in a region under the irregularity-forming layer and which is electrically isolated from the other regions of conductive materials, the island-shaped pattern forming a predetermined pattern shaped to compensate for a height difference caused by a region where the height of the conductive film forming the active element is different than the regions where the island-shaped pattern is located and being composed of at least one of the conductive film forming the wire and the conductive film forming the active element.

20. The reflective electrooptic device according to claim 19, the irregularity-forming layer being composed of a photosensitive resin provided with irregularities thereon in conformity with gentle changes in film thickness, and the surface of the light reflection film being provided with the irregular pattern transferred from the irregularities formed on the surface of the irregularity-forming layer.

21. The reflective electrooptic device according to claim 20, the irregularity-forming layer being formed by half exposure performed for the photosensitive resin using an exposure mask and by development.

22. The reflective electrooptic device according to claim 19, the irregularity-forming layer being composed of a photosensitive resin formed selectively into a predetermined pattern, and the irregular pattern being formed on the surface of the light reflection film in accordance with the presence and non-presence of the irregularity-forming layer.

23. The reflective electrooptic device according to claim 22, the irregularity-forming layer being formed by exposure performed for the photosensitive resin using an exposure mask and by development.

24. The reflective electrooptic device according to claim 22, further including an upper insulating film on the irregularity-forming layer, the surface of the light reflection film being provided with the irregular pattern which is transferred from irregularities of the irregularity-forming layer via the upper insulating film.

25. The reflective electrooptic device according to claim 19, the irregularity-forming layer being provided over almost the entire area of each pixel.

26. The reflective electrooptic device according to claim 19, the light reflection film being provided with a light-transmitting window.

27. The reflective electrooptic device according to claim 19, the light reflection film being provided with a light-transmitting window, and the island-shaped pattern being provided in a region other than that overlapping the light-transmitting window in plan view.

* * * * *